(12) United States Patent
Pidduck et al.

(10) Patent No.: US 12,164,582 B2
(45) Date of Patent: Dec. 10, 2024

(54) SYSTEM AND METHOD FOR SEARCHING BASED ON TEXT BLOCKS AND ASSOCIATED SEARCH OPERATORS

(71) Applicant: Open Text SA ULC, Halifax (CA)

(72) Inventors: Patrick Thomas Sidney Pidduck, Waterloo (CA); Michael James Dent, Waterloo (CA)

(73) Assignee: OPEN TEXT SA ULC, Halifax (CA)

( * ) Notice: Subject to any disclaimer, the term of this patent is extended or adjusted under 35 U.S.C. 154(b) by 161 days.

(21) Appl. No.: 17/861,003

(22) Filed: Jul. 8, 2022

(65) Prior Publication Data

US 2022/0342950 A1 Oct. 27, 2022

Related U.S. Application Data

(63) Continuation of application No. 17/038,214, filed on Sep. 30, 2020, now Pat. No. 11,449,564, which is a continuation of application No. 15/911,412, filed on Mar. 5, 2018, now Pat. No. 10,824,686.

(51) Int. Cl.
  *G06F 16/9535* (2019.01)
  *G06F 16/31* (2019.01)
  *G06F 16/33* (2019.01)

(52) U.S. Cl.
  CPC ........ *G06F 16/9535* (2019.01); *G06F 16/322* (2019.01); *G06F 16/3341* (2019.01)

(58) Field of Classification Search
  CPC . G06F 16/9535; G06F 16/322; G06F 16/3341
  See application file for complete search history.

(56) References Cited

U.S. PATENT DOCUMENTS

| | | | |
|---|---|---|---|
| 6,801,905 | B2 | 10/2004 | Andrei |
| 7,693,824 | B1 | 4/2010 | Diament |
| 8,417,689 | B1 | 4/2013 | Waas |
| 11,556,527 | B2 | 1/2023 | Pidduck |
| 11,775,541 | B2 | 10/2023 | Pidduck |
| 11,977,581 | B2 | 5/2024 | Pidduck |
| 2003/0177124 | A1 | 9/2003 | Sauri |
| 2006/0173882 | A1 | 8/2006 | Furukawa |
| 2007/0033165 | A1 | 2/2007 | Sheinwald |
| 2007/0276825 | A1 | 11/2007 | Dettlinger |
| 2009/0094220 | A1 | 4/2009 | Becker |
| 2009/0193210 | A1 | 7/2009 | Hewett |
| 2011/0225038 | A1 | 9/2011 | Fontoura |
| 2011/0246925 | A1 | 10/2011 | Marchand |
| 2013/0006964 | A1 | 1/2013 | Hammerschmidt |
| 2013/0066880 | A1 | 3/2013 | Schramm |
| 2015/0193489 | A1 | 7/2015 | Bachar |
| 2016/0004757 | A1 | 1/2016 | Tsuchida |

(Continued)

OTHER PUBLICATIONS

Notice of Allowance with U.S. Appl. No. 16/628,942, mailed Sep. 14, 2022, 6 pgs.

(Continued)

*Primary Examiner* — Truong V Vo
(74) *Attorney, Agent, or Firm* — Sprinkle IP Law Group

(57) ABSTRACT

Embodiments as disclosed may provide a search operator that addresses the problems inherent in the searching based on an entire block of text. Specifically, embodiments as disclosed may provide a search operator that may address the problem of complex query construction and efficient and effective implementation for finding objects based on a block of text.

21 Claims, 9 Drawing Sheets

(56) References Cited

U.S. PATENT DOCUMENTS

| | | |
|---|---|---|
| 2016/0132565 A1 | 5/2016 | Pfeifle |
| 2016/0239527 A1 | 8/2016 | Jang |
| 2018/0011899 A1 | 1/2018 | Dean |
| 2023/0109772 A1 | 4/2023 | Pidduck |
| 2023/0409588 A1 | 12/2023 | Pidduck |

OTHER PUBLICATIONS

Notice of Allowance for U.S. Appl. No. 16/926,334, mailed Jan. 5, 2024, 9 pgs.
Notice of Allowance for U.S. Appl. No. 17/589,415, mailed May 24, 2023, 9 pgs.
Office Action for U.S. Appl. No. 16/926,334, mailed Aug. 31, 2023, 18 pgs.
Office Action for U.S. Appl. No. 18/080,060, mailed Dec. 8, 2023, 16 pgs.
Office Action for U.S. Appl. No. 16/926,334, mailed Jan. 19, 2023, 25 pgs.
Office Action for U.S. Appl. No. 17/589,415, mailed Jan. 19, 2023, 24 pgs.
Office Action for U.S. Appl. No. 18/080,060 mailed May 29, 2024, 12 pgs.
Office Action for U.S. Appl. No. 18/455,071, mailed Jul. 3, 2024, 28 pgs.
Office Action for U.S. Appl. No. 18/080,060 mailed Sep. 6, 2024, 12 pgs.

| OBJECT ID | AUTHOR ID | OWNER ID | EDITOR ID | AUTHOR NAME | OWNER NAME | CREATOR NAME | EDITOR NAME | TEXT |
|---|---|---|---|---|---|---|---|---|
| | | | | | | | | |
| | | | | | | | | |
| | | | | | | | | |
| | | | | | | | | |
| | | | | | | | | |
| | | | | | | | | |
| | | | | | | | | |

| ID | | | | | |
|---|---|---|---|---|---|
| 1 | RIVERS | | RAINFALL | | |
| 2 | | | RAINFALL | | STREAM |
| 3 | | | | PONDS | |
| 4 | | | | | |
| 5 | | LAKES | RAINFALL | PONDS | |
| 6 | | | | | |
| 7 | RIVERS | LAKES | | | |
| 8 | | | RAINFALL | | STREAM |
| 9 | | | | | |
| 10 | | | | | |
| 11 | | | | | |
| 12 | | LAKES | | PONDS | |
| 13 | RIVERS | LAKES | | | |
| 14 | | LAKES | | | |
| 15 | RIVERS | LAKES | | | STREAM |
| 16 | | | | | |
| 17 | | | | | |
| 18 | | | | | |
| 19 | RIVERS | | RAINFALL | | |
| 20 | RIVERS | LAKES | | | |
| 21 | | | RAINFALL | PONDS | |
| 22 | | | | | STREAM |
| 23 | | LAKES | RAINFALL | | STREAM |
| 24 | | LAKES | | | |
| 25 | RIVERS | | | PONDS | |
| 26 | | | | | |
| 27 | | | | PONDS | |
| 28 | | | | | |
| 29 | | | | | |
| 30 | RIVERS | LAKES | RAINFALL | | |
| 31 | RIVERS | | | | |
| 32 | | | | | |
| 33 | | | | | STREAM |
| 34 | | | | | |
| END | | | | | |

FIG. 10

| OPERATION | RIVERS | LAKES | RAINFALL | PONDS | STREAMS | MATCH ID |
|---|---|---|---|---|---|---|
| STARTING POINT | 0 | 0 | 0 | 0 | 0 | |
| NEXT 0 | 1 | 5 | 1 | 3 | 2 | |
| NEXT 1 | 7 | 5 | 2 | 3 | 2 | |
| NEXT 2 | 7 | 5 | 5 | 3 | 8 | |
| NEXT 3 | 7 | 5 | 5 | 5 | 8 | 5 |
| NEXT 5 | 7 | 7 | 8 | 12 | 8 | |
| NEXT 7 | 13 | 12 | 8 | 12 | 8 | |
| NEXT 8 | 13 | 12 | 19 | 12 | 15 | |
| NEXT 12 | 13 | 13 | 19 | 21 | 15 | |
| NEXT 13 | 15 | 14 | 19 | 21 | 15 | |
| NEXT 14 | 15 | 15 | 19 | 21 | 15 | 15 |
| NEXT 15 | 19 | 20 | 19 | 21 | 22 | |
| NEXT 19 | 20 | 20 | 21 | 21 | 22 | |
| NEXT 20 | 25 | 23 | 21 | 21 | 22 | |
| NEXT 21 | 25 | 23 | 23 | 25 | 22 | |
| NEXT 22 | 25 | 23 | 23 | 25 | 23 | 23 |
| NEXT 23 | 25 | 24 | 30 | 25 | 33 | |
| NEXT 24 | 25 | 30 | 30 | 25 | 33 | |
| NEXT 25 | 30 | 30 | 30 | 27 | 33 | |
| NEXT 27 | 30 | 30 | 30 | END | 33 | 30 |
| NEXT 30 | 31 | END | END | END | 33 | |
| NEXT 31 | END | END | END | END | 33 | |
| NEXT 33 | END | END | END | END | END | |

FIG. 11

SYSTEM AND METHOD FOR SEARCHING BASED ON TEXT BLOCKS AND ASSOCIATED SEARCH OPERATORS

CROSS-REFERENCE TO RELATED APPLICATION(S)

This application is a continuation of, and claims a benefit of priority under 35 U.S.C. 120 of, U.S. patent application Ser. No. 17/038,214 filed Sep. 30, 2020, entitled "SYSTEM AND METHOD FOR SEARCHING BASED ON TEXT BLOCKS AND ASSOCIATED SEARCH OPERATORS," which is a continuation of, and claims a benefit of priority under 35 U.S.C. 120 of, U.S. patent application Ser. No. 15/911,412 filed Mar. 5, 2018, issued as U.S. Pat. No. 10,824,686, entitled "SYSTEM AND METHOD FOR SEARCHING BASED ON TEXT BLOCKS AND ASSOCIATED SEARCH OPERATORS," which is hereby incorporated herein for all purposes.

TECHNICAL FIELD

This disclosure relates generally to search engines. More particularly, this disclosure relates to systems and methods for search engines that facilitate specification of complex search queries using simple operators and are capable of efficient implementation of these queries.

BACKGROUND

A search engine is a computer program used to index electronically stored information (referred to as a corpus) and search the indexed electronic information to return electronically stored information responsive to a search. Items of electronic information that form the corpus may be referred to interchangeably as (electronic) documents, files, objects, items, content, etc. and may include objects such as files of almost any type including documents for various editing applications, emails, workflows, etc. In a conventional search engine, a user submits a query and the search engine selects a set of results from the corpus based on the terms of the search query. The terms of search queries usually specify (key)words, terms, phrases, logical relationships, metadata fields to be searched, synonyms, stemming variations, etc.

Traditionally, search features or operators are fairly well understood by a user constructing a search query. Boolean operations, proximity, even stemming, regular expressions and wildcards can be understood and utilized in a predictable way. Thus, users can clearly relate the query to the search results. In some instances however, users may utilize search systems in less than an intuitive manner. These types of uses may occur when a user wishes to search based on a portion or section of a document or a large amount of text (collectively referred to as a block of text) as opposed to a few keywords. Consider the case where a user has a reference document, and copies an entire paragraph from the document and pastes it as the search query. This situation may occur, for example, when a user is trying to locate the document from which the text originated, or to locate similar documents to the one from which the block of text originated (e.g., for example in an eDiscovery context for litigation support or forensics, or for automated classification systems).

While such a search may at first blush seem likely to return the proper documents, in actuality the reality is quite the opposite. In particular, certain elements of the text block used in the search may themselves be processed as search terms or operators (e.g., the words "and", "or" or "not") may be interpreted by the search system as Boolean search operators. Even if such a search is submitted using a search mode where these types of operators are not treated as search operators, the search may be ineffective. Such a search will treat every word of the text block entered as a keyword or term. Thus, such a search is effectively a search with a logical AND between each term of the text block. For a typical text block, the resulting search is unfeasibly long and complex. At some point depending on the number of words in the text block, a typical search system attempting to implement such a query will become encumbered by memory or performance failures (e.g., timeouts or the like).

Another approach that may be utilized for such searches is to treat the entire text block as an exact phrase. This approach may also suffer from performance and memory constraints with large text blocks. Moreover, exact phrases are particularly sensitive to transcription errors. Exact phrase matching is also too specific to accommodate use cases related to similarity. Thus, only documents that contain exactly the text block may be located in such a search.

An approach utilized by some users when constructing a search for a text block is to use a logical OR between each term, and then rely on relevance computations to order the results such that the best matches are at the top of the list. This approach may appear attractive in scenarios where finding similar documents is desired, not just a single exact match. However, the result set from such OR operations on many terms is typically extremely large, and the computational cost of establishing the relevance will frequently exceed memory or time constraints.

Exacerbating all the performance and technical issues associated with searching based on text blocks is that in many cases, users would like to locate not just exact matches, but also documents with similar content. These similarity searches may require utilization of search options such as the application of stemming or use of spelling variations on the terms of the text block. Enabling these options will make the memory and performance issues discussed even more pronounced.

What is needed, therefore, are systems and methods that allow simple specification of searches using blocks of text and that efficiently implement such searches.

SUMMARY

To those ends, among others, embodiments as disclosed may provide a search operator that addresses the problems inherent in the searching based on an entire block of text. Specifically, embodiments as disclosed may provide a search operator (referred to without loss of generality as a TEXT operator) that may address the problem of complex query construction and efficient and effective implementation for finding objects based on a block of text. Embodiments may efficiently and effectively implement such searches by evaluating the terms of the text block provided in a search query including such a search operator to determine an initial set of terms of the text block. The initial set of terms is ordered using preselection rules. A final set of terms is then selected from the initial set of terms based on the ordering of the terms. Another search query can then be formed from these selected final set of terms and executed against a corpus of objects to determine a set of responsive objects for the TEXT operator of the search query.

Furthermore, embodiments as disclosed herein may efficiently implement the search query constructed from the final set of search terms selected from the initial set of terms in a TEXT operator using certain term operators to construct the query with the final set of search terms. In particular, embodiments as disclosed may utilize a search operator (referred to generally as a subset operator) in constructing a search query using the final set of terms that may address the problem of complex query construction, among other problems, for finding objects that include some number (N) of a set or terms (M). As such, embodiments of implementing a search query for the final set of terms selected from a TEXT query may be formed using a subset operator to find a threshold number of the final set of search (e.g., N of the final M set of search terms).

In this manner, embodiments may provide a number of advantages, including avoiding the need to execute huge queries and providing many technical improvements in the functioning of the computer when applying such text searching, including the use of fewer computer resources such as memory or processor cycles; requiring less time to execute; and returning more responsive, accurate and useful results. Moreover, embodiments of such search operators may be usefully applied in a variety of contexts such as litigation discovery, classification of documents in a corpus, etc.

In one embodiment, a search system may include a processor and a data store storing a corpus and an index of the corpus. The corpus comprises a set of objects, each object associated with a corresponding identifier. The search system can receive a first search query having a TEXT operator, the TEXT operator including a block of text comprising a set of text terms. An initial set of terms can be determined from the set of text terms and the initial set of search terms evaluated to order the initial set of search terms using a set of preselection rules. A final set of search terms can be selected from the initial set of search terms based on the order of the initial set of search terms, where the final set of search terms is a reduced number of the initial set of search terms. A second search query is constructed from the final set of search terms and the second search query executed against the corpus of objects using the index of the corpus to determine a set of responsive objects to the second search query. The identifiers for the one or more responsive objects of the corpus are then returned in response to the first search query.

In some embodiments, the second search query comprises a subset operator including a threshold and the final set of search terms. The subset operator may be executed by generating a search tree for the subset operator, the search tree having a subset operator node including a subset process configured according to the threshold, wherein the subset operator node has, for each of the final set of search terms, a sub-node comprising a term process corresponding to that search term. Executing the second search query may thus comprise executing the search tree using the index to determine the one or more responsive objects of the corpus that satisfy the subset operator. Executing the search tree in turn comprises receiving a result from each of the term processes at the subset process and evaluating the result from each of the term processes by the subset process to determine if an object has a number of the set of terms equal to or greater than the threshold and determining the identifiers for the one or more responsive objects of the corpus that satisfy the subset operator.

In another embodiment, each of the term processes is an iterator configured to evaluate the objects of the corpus according to an order of the identifiers of the objects, and the result is an identifier of the next object containing the search term associated with the term process according to the order.

In one embodiment, the initial set of search terms includes a phrase extracted from the initial set of terms and comprising a plurality of the initial set of terms.

Embodiments may also identify that a first term of the initial set of search terms is a stop word, wherein the order assigned to the first term is based on the identification of the first term as a stop word. The identification of the first term as the stop word may be done by comparing the first term to a set of stop words. The set of stop words may be, for example, determined based on a frequency of appearance of each of the set of stop words in the corpus of objects. Moreover, the index of the system may comprise a set of index partitions, each index partition corresponding to a portion of the set of objects of the corpus. Here, the set of stop words may include partition stop words for each index partition including first partition stop words for a first index partition determined based on a frequency of appearance of terms in a first portion of the set of objects corresponding to the first index partition.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

FIG. 10 is a table illustrating example data.

FIG. 11 is a table illustrating an example use of a subset operator with the data of FIG. 10.

DETAILED DESCRIPTION

Figure 1:
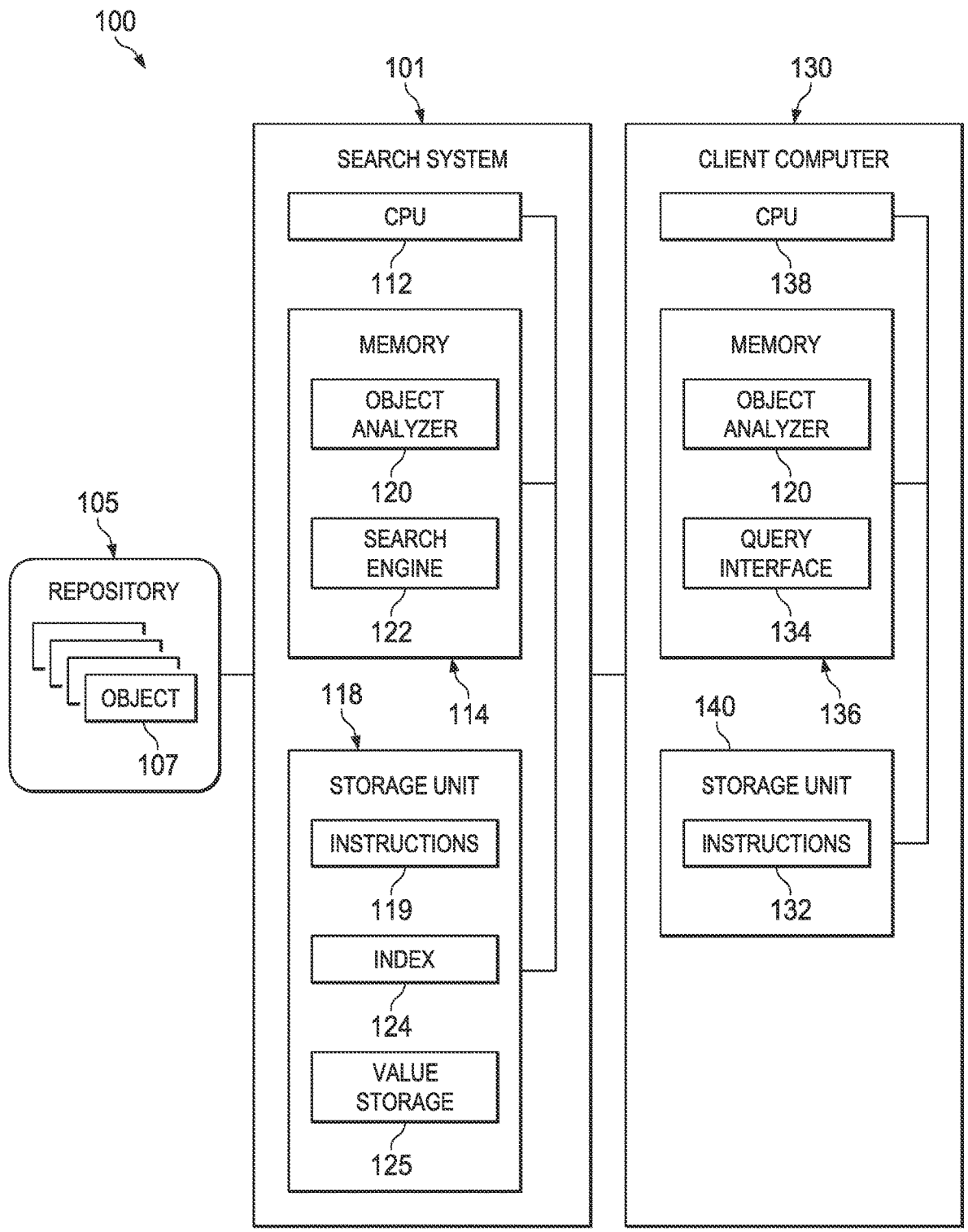
FIG. 1 is a block diagram of one embodiment of an architecture and environment including a search system.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Software implementing embodiments disclosed herein may be implemented in suitable computer-executable instructions that may reside on a computer-readable storage medium. Within this disclosure, the term "computer-readable storage medium" encompasses all types of data storage medium that can be read by a processor. Examples of computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, hosted or cloud-based storage, and other appropriate computer memories and data storage devices.

Before discussing embodiments in detail, some context may be useful. As discussed, a search engine is a computer program or a set of programs used to index information (referred to as a corpus) and search for indexed information. In a conventional search engine, a user submits a query and the search engine selects a set of results from the corpus based on the terms of the search query. Generally, search features or operators are fairly well understood by a user constructing a search query. Boolean operations, proximity, even stemming, regular expressions and wildcards can be understood and utilized in a predictable way. Thus, users can clearly relate the query to the search results. In some instances however, users may utilize search systems in less than an intuitive manner. These types of uses may occur when a user wishes to search based on a portion or section of a document or a large amount of text (collectively referred to as a block of text) as opposed to a few keywords. Consider a case where a user has a reference document, copies an entire paragraph from the document and pastes it as the search query. This situation may occur, for example, when a user is trying to locate the document from which the text originated, or to locate similar documents to the one from which the block of text originated (e.g., for example in an eDiscovery context for litigation support or forensics or automated classification systems).

For example, a user enters the first couple of sentences from the novel "Moby Dick" into the search query box, hoping to locate a copy of the novel in your document management system. They enter:

Call me Ishmael. Some years ago—never mind how long precisely—having little or no money in my purse, and nothing particular to interest me on shore, I thought I would sail about a little and see the watery part of the world. It is a way I have of driving off the spleen and regulating the circulation.

The user is likely thinking that, given that they have provided such a large block of text, it should be easy to find where Moby Dick is stored, or similar documents. However, this type of query often fails. In particular, certain elements of the text block used in the search may themselves be processed as search terms or operators (e.g., the words "and", "or" or "not") may be interpreted by the search system as Boolean search operators. For example, for certain query languages or search systems, a search generated based on the text block above may become:

(Call me Ishmael. Some years ago—never mind how long precisely—having little) OR (no money in my purse) AND (nothing particular to interest me on shore, I thought I would sail about a little) AND (see the watery part of the world. It is a way I have of driving off the spleen) AND (regulating the circulation)

Even if such a search is submitted using a search mode where these types of operators are not treated as search operators, the search may be ineffective. Such a search will treat every word of the text block entered as a term. Thus, such a search is effectively a search with a logical AND between each term of the text block:

Call AND me AND Ishmael AND Some AND years AND ago AND never AND mind AND . . .

For a typical text block, the resulting search is unfeasibly long and complex. At some, point, depending on the number of words in the text block, a typical search system attempting to implement such a query will become encumbered by memory or performance failures (e.g., timeouts or the like).

Other approaches to such text block searching also suffer from such technical, performance and efficiency problems. They may simultaneously have large processing memory or time requirements while simultaneously being ineffective by returning non-responsive, incomplete or over-inclusive results. Systems and methods that allow simple specification of searches using blocks of text and that efficiently implement such searches are therefore needed.

To that end, attention is now directed to embodiments of the search operators and their implementations as disclosed herein. Specifically, embodiments as disclosed may provide a search operator (referred to without loss of generality as a TEXT operator) that may address the problem of complex query construction and efficient and effective implementation, among other problems, for finding objects based on a block of text. Embodiments may efficiently and effectively implement such searches by evaluating the terms of the text block provided in a search query including such a search operator to determine an initial set of terms of the text block. The initial set of terms is ordered using preselection rules. A final set of terms is then selected from the initial set of terms based on the ordering of the terms. This number of final search terms in the set of terms selected can be based on a target number of desired final search terms or a desired target minimum or maximum number of final search terms. Another search query can then be formed from this selected final set of terms and executed against a corpus of objects to determine a set of responsive objects for the initial search query.

Accordingly, embodiments may avoid the need to execute huge queries and provide many technical improvements in the functioning of the computer when applying such text searching, including the use of fewer computer resources such as memory or processor cycles, requiring less time to execute, and returning more responsive, accurate and useful results. Moreover, embodiments of such search operators may be usefully applied in a variety of contexts such as litigation discovery, classification of documents in a corpus, the search exemplars including the location of "like" or similar documents (e.g., based on the content of a reference document or set of reference documents), etc.

Furthermore, embodiments as disclosed herein may efficiently implement the search query constructed from the final set of search terms selected from the initial set of terms in a TEXT operator using certain term operators to construct the query with the final set of search terms. Specifically, embodiments as disclosed may utilize a search operator (referred to generally as a subset operator) in constructing a search query using the final set of terms that may address the problem of complex query construction, among other problems, for finding objects that include some number (N) of a set or terms (M). In particular, embodiments as disclosed herein may efficiently implement the searches specified by such subset operators using a subset process that may combine results from a set of term processes where only one term process may be needed for each search term (or search term variant).

Such subset operators may, for example, take the form of Subset ([N], term 1, term 2 . . . term M). A subset process may combine results from multiple term processes. Specifically, in most cases the subset process will utilize order M term processes for M search terms and combine the results from these term processes to return objects that have N of those M terms. By implementing such a subset process, the N of M search problem may be solved efficiently at the process and search tree level as opposed to at the query level (e.g., by expanding or constructing such a query manually). Thus, using such a subset process subset matching may be implemented in a manner that would be impossible to do at a query construction level.

As such, embodiments of implementing a search query for the final set of terms selected from a TEXT query may be formed using a subset operator to find a threshold number of the final set of search (e.g., N of the final M set of search terms). In this manner, embodiments may avoid the need to execute such huge queries and provide further technical improvements in the functioning of the computer when applying such subset searching for the final search terms, including the use of fewer computer resources such as memory or processor cycles and may require less time to execute.

Before describing embodiments in detail, it may be helpful to discuss an example of a search system. FIG. 1 depicts a block diagram illustrating an example of computing environment 100 having object repository 105, search system 101, and client computer 130. Object repository 105 may comprise a file server or database system or other storage mechanism remotely or locally accessible by search system 101. Object repository 105 may store objects 107 (e.g., documents, images, emails or other objects) that may be searchable by search system 101.

In the embodiment of FIG. 1, search system 101 comprises a server having central processing unit 112 connected to memory 114 and storage unit 118. Central processing unit (CPU) 112 may represent multiple processors, a processor(s) with multiple processing cores and the like. Storage unit 118 may include a non-transitory storage medium such as hard disk drives, flash memory devices, optical media and the like. Search system 101 may be connected to a data communications network such as the Internet, a local area network (LAN), a wide area network (WAN), a cellular network or some other network or combination of networks.

Storage unit 118 stores computer executable instructions 119 and index 124. Computer executable instructions 119 can represent multiple programs or operating system code. In one embodiment, instructions 119 are executable to provide object analyzer 120 and search engine 122. Object analyzer 120 and search engine 122 may be portions of the same program or may be separate programs. According to one embodiment, for example, object analyzer 120 is a component of a document management system while search engine 122 is a separate program that interfaces with the document management system. Furthermore, object analyzer 120 and search engine 122 can be implemented on different computing systems and can, themselves, be distributed.

Index 124 may include metadata used to identify objects in response to a search query and may also include text used to identify objects. Specifically, the index 124 may include an inverted copy of the indexed object. An inverted index may therefore contain a set of terms along with an identification of which objects contain those terms. Index 124 can include a single index containing metadata and text, separate metadata and text indexes or other arrangements of information. While shown as a single index, index 124 may include multiple indices. Further, as will be described further below, index 124 may be partitioned, with different objects being represented in each partition.

Client computer system 130 may include components similar to those of the server of search system 101, such as CPU 138, memory 136, and storage 140. Additionally, client computer system 130 may include executable instructions 132 to provide user interface 134 that allows a user to enter a search query or through which the search system can receive a search query, such as application programming interface (API), a Web Services interface or another type of interface. These instructions 132 may have, for example, be provided by search system 101 in response to an access by client computer 130. User interface 134 may be provided through a web browser, file system interface or other program.

Those skilled in the art will appreciate that search system 101 shown in FIG. 1 is merely an example of a computing system and embodiments of a search system that may be implemented using other computing systems (e.g., desktop computers, laptops, mobile computing devices or other computing devices with adequate processing and memory) including multiple computers acting together to provide a search system (e.g., a cluster of servers or other computing devices connected by a network acting together to provide the search system). Similarly, client computer 130 may include any suitable desktop computer, laptop, mobile device, server or other computing system.

In operation, object analyzer 120 may analyze objects in object repository 105 to determine information to be indexed in index 124. When an object 107 is added to search system 101, two types of information are generally indexed, one or both of full text and metadata. As an example, suppose object 107 being added to search system 101 is a text file; the text or content of the file is indexed as well as information about the file. In some cases, the metadata itself may include important information associated with the object 107. This metadata may need its own descriptive metadata indicating attributes of the metadata. In some cases, the metadata on its own without full text content is sufficient to represent an object. Object analyzer 120 can send indexing instructions to search engine 122 to direct search engine 122 to add, modify, or delete metadata or text in index 124.

Object analyzer 120 may be a portion of a larger program such as a document management program, may be a separate program or may be implemented according to any suitable programming architecture. In one embodiment, the process of determining metadata and text to be indexed may be carried out by any number of different programs on a computer system or distributed across computer systems.

Detailed discussions concerning an example of an object analyzer can be found in U.S. patent application Ser. No. 13/595,570 filed Aug. 27, 2012, entitled "SYSTEM AND METHOD OF SEARCH INDEXES USING KEY-VALUE ATTRIBUTES TO SEARCHABLE METADATA," which is fully incorporated by reference herein.

When a search query is received at search system 101, search engine 122 can search the information in index 124 to identify objects (content) 107 responsive to the search query and return a list or other representation of those objects 107 to client computer 130.

Figure 2:
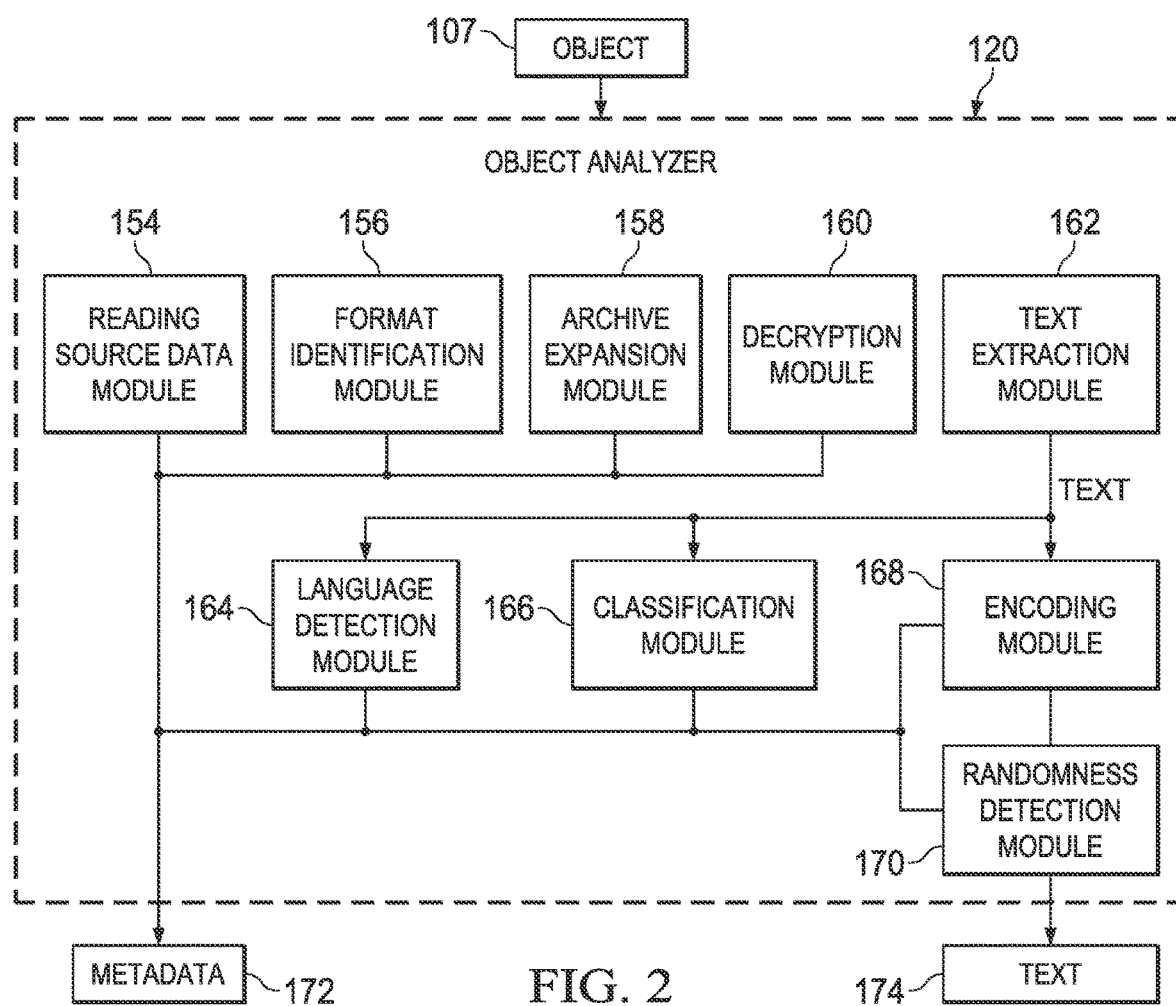
FIG. 2 is a block diagram of one embodiment of an object analyzer.

FIG. 2 depicts a diagrammatic representation of one embodiment of an object analyzer 120 for analyzing an object 107. Object analyzer 120 can comprise various modules to process an object 107. Reading source data module 154 can open the object 107. Format identification module 156 examines the object to determine what type of file or data the object 107 comprises. Archive expansion module 158 unzips files or otherwise decompresses files if the object 107 is a compressed file. Decryption module 160 decrypts all or part of the data in the object 107. Text extraction module 162 applies rules to text in the object 107 to extract text for index 124. Language detection module 164 examines the text to determine the language in which the text is written. Classification module 166 applies rules based upon text and metadata to classify content. Encoding module 168 can convert text to a supported encoding. Randomness detection module 170 can analyze data to be indexed to reject random information.

Object analyzer 120 may include modules that can derive metadata for object 107. For example, a document management system may provide a limited amount of metadata with the object 107. Object analyzer 120 can derive other metadata from the metadata provided, text or other properties of the object 107. As a specific example, a filter or piece of code that extracts the text from a PowerPoint presentation might also create metadata about the presentation. In this example, the metadata which is not provided by the document management system and which is derived by object analyzer 120 may include the number of slides in the presentation, the title of the file, the name of the presentation author, or the size of paper the presentation was designed to print on. More complex examples of derived metadata might include statistical analysis to generate a list of keyword or key concepts in the document; determining the subject person or company of the text; sentiment analysis—is the tone of the text positive or negative; or language identification—in what language is the text written. Further examples of metadata that may either be provided by the document management system (or other application) or derived by the analyzer may be the date the object was created, the size of the object in bytes, the name of the object, a description of the object or the like.

The embodiment of FIG. 2 is provided by way of example. Object analyzer 120 may include any number of other modules to analyze an object and extract text 174 and metadata 172 to be indexed. Object analyzer 120 may be a portion of a larger program, such as a document management program, may be a separate program or may be implemented according any suitable programming architecture. In one embodiment, the process of determining metadata 172 and text 174 to be indexed may be carried out by any number of different programs on a computer system or distributed across computer systems.

Metadata 172 and text 174 thus processed by object analyzer 120 may be provided to a search engine. An example search engine will now be described with reference to FIG. 3.

Figures 3, 4:
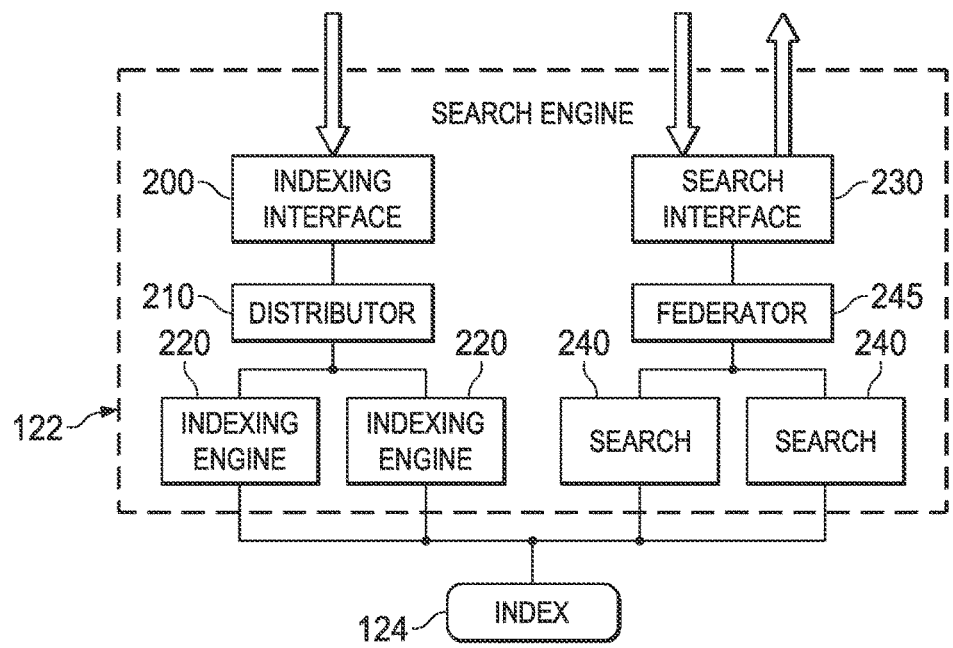
FIG. 3 is a block diagram of one embodiment of a search system.
FIG. 4 is a block diagram of one embodiment of regions or fields for a portion of an index.

FIG. 3 depicts a diagrammatic representation of logical blocks for one embodiment of a search engine 122. Search engine 122 may provide an indexing interface 200 that receives indexing requests (e.g., from object analyzer 120) or other source. A distributor module 210 may distribute the indexing requests to indexing engine 220 that acts on an indexing request to update index 124. Search engine 122 may also include a search interface 230 to receive queries (e.g., from a document management system or other source). Search interface 230 may send queries to search modules 240. These queries may be sent or distributed through federator 245 which may serve as a coordinator for the search modules 240. Each of the search modules 240 may be a search process configured search the corpus based on a related search term.

For example, a coordinator of the federator 245 may define the search modules 240 and a hierarchy in order to define a search tree of the search modules 240 corresponding to the received query. The coordinator may then instantiate search modules 240 and provide each module 240 with the data (e.g., related sub modules 240, search term for the search module 240, etc.) needed to process the search tree. The federator 245 may then obtain results from one or more of the search modules 240 (e.g., the search module 240 that is a root node of the search tree) and generate a response to the query received through search interface 230. This response may identify one or more responsive objects. Search modules 240 are responsible for implementing a term process for one or more terms using index 324 or implementing an operator process for a search operator including, for example, performing searches on an index partition, and performing tasks such as computing relevance score, sorting results, and retrieving metadata regions to return in a query. Thus, a search tree may include a set of hierarchically arranged search modules 240 as nodes of the search tree, each search module 240 being a term process or an operator process.

Search interface 230 may be configured to receive a search query from a user, and search index 124 for objects that meet the criteria set forth in the search query. Query languages may also be configured to permit sorting results of a search. Various rules may be used to determine the sort order. While users construct a search query, it should be noted that the user could be any system that issues queries to the search system, and may include other computer programs searching on behalf of other users, creating reports or running automatic processes. Additionally, as described above, there can be many different types of metadata in the search index. Thus, the search queries are not restricted to "text" based search terms.

In the context of this disclosure, the phrase "search term" represents a technical concept or interpretation. For example, a search term in the context of this disclosure can be a word, a string, or any combination of the following:

phrases
numbers
strings
logical operations (e.g., AND, OR, NOT, SUBSET, STEM, etc.)
ordering or operations (e.g., using parenthesis)
relationships (e.g., greater than, less than, not equal to, etc.)

similarities based on thesaurus, stemming, sounds-like, etc.

wildcards and pattern matching

To this end, a search term can also refer to any term that is used in a query and that has been modified or generated by any commonly used techniques.

For context, a search term could be a word "john" or a more complex expression like:

>"bob" or !=("123" or a*)) and (sounds-like "smith" or thesaurus "doctor" or "medical doctor" or stem "medical").

The embodiment of FIG. 3 is provided by way of example. Search engine 122 may include any number of other modules or configurations to update and search an index. For example, search modules 240 and indexing engines 220 may be a single module. Search engine 122 may be a portion of a larger program, such as a document management program, may be a separate program or may be implemented according to any suitable programming architecture. In one embodiment, the processes of search engine 122 may be distributed across multiple computer systems. Furthermore, while in FIG. 3, index 124 is illustrated as a single index, index 124 may comprise a set of smaller indexes. For example, a separate index can be used by each indexing engine.

FIG. 4 depicts a diagrammatic representation of one embodiment of regions or fields for a portion of index 124. Index 124 includes a list of some or all objects 107 in repository 105 (FIG. 1), each identified by a unique identifier 301 (also referred to as object ID). Index 124 further includes a set of metadata regions 300 (also referred to as metadata fields). A metadata field 300 may include more than one entry for an object. The metadata fields can each have associated values in value storage locations within storage unit 118, (e.g. value storage 125). In other embodiments, the values may be discarded. The index may include a list of dictionary terms contained in the metadata values of the object and pointers to where the metadata values corresponding to the field are stored. Index 124 may also include other regions for an object, such as a text region 302. Text region 302 may, for example, include a list of terms in the text of an object. Index 124 may include some or all of the content of an object.

While shown as a single index, index 124 may be partitioned. In index partitioning, in one embodiment, the index of objects in repository 105 may be split into multiple indexes such that some objects are listed in one index partition, while other objects are listed in the other index partitions. As described below with reference to FIGS. 5 and 6, a 'partition' comprises a portion or fragment of index 124 and is associated with indexing engine 220 and search module 240. Note that it is possible to copy a partition and associate a different index engine and search engine with this copied partition. Index partitioning may also reduce resource usage and search time. Furthermore, separate indexes may be maintained for metadata and text and/or different metadata regions or fields. Index 124 can be stored according to any suitable storage scheme. Example storage schemes may include "Memory Storage," "Disk Storage" and "Retrieval Storage":

Memory Storage: in this storage scheme, all the elements of the index are kept in memory. This provides the fastest operation when search results must be retrieved, since the memory storage mode minimizes disk activity. Conversely, memory storage consumes the most memory in partitions. For example, text regions which are frequently searched and retrieved for display may be held in memory.

Disk Storage: in this storage scheme, the dictionary and index are kept in memory, but the value storage is located on disk within a Checkpoint file. Keyword searches are still fast, but search queries which need to examine the original data, such as phrase searches, are generally slower. Retrieving values from disk for display is also slower. For regions which are not commonly searched and displayed, disk storage may be a desirable choice. Disk storage is also suitable as a storage mode for systems utilizing solid state hardware.

Retrieval Storage: in this storage scheme, storage is optimized for text metadata regions which need to be retrieved and displayed, but do not need to be searchable. As an example, text values may be stored on disk within the Checkpoint file, and there is no dictionary or index at all. This storage scheme can be used, for example, for regions such as Hot Phrases and Summaries.

Figure 5:
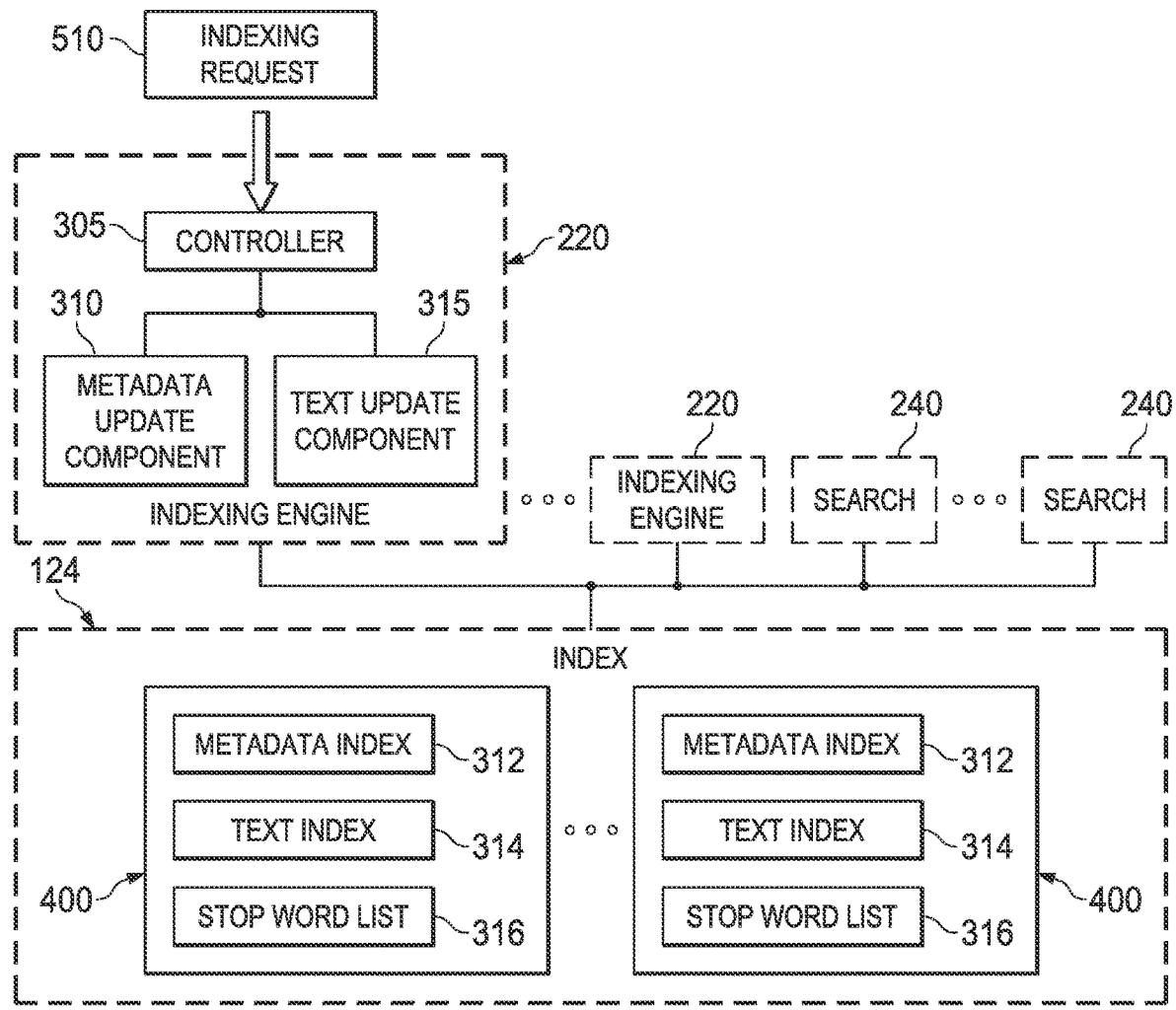
FIG. 5 is a block diagram of one embodiment of an indexing engine.

FIG. 5 depicts a diagrammatic representation of one embodiment of an indexing engine 220 to maintain a partition of index 124. Here, for example, index 124 is divided into "n" partitions 400, with each partition including a metadata index 312 and a text index 314 indexing a portion of the objects of the corpus. In this embodiment, indexing engine 220 can include an indexing controller 305, a metadata update component 310, and a text update component 315. In this embodiment, index 124 is maintained as a separate metadata index 312, which contains metadata for objects in repository 105, and text index 314, which contains content text from objects in repository 105, with a known relationship between the text and metadata components for each object in the index.

Indexing controller 305 receives indexing requests (e.g., from a distributor, another application or other source). An indexing request received at the indexing controller 305 may include an instruction to add an object, delete an object, modify an object or replace an object in index 124. Such an indexing request may also include the information to be added or changed, such as the full text content to be indexed and the associated metadata for the object. An indexing request may also contain derived metadata.

The text (derived text or full text content) of an indexing request may be a text file. It could be data exported from a database or other information system. Commonly, the text is the human-readable information within a document composed on a computer. In this scenario, a file such as a Microsoft Word document would be analyzed by a filtering step to extract the text, which can be stripped of unnecessary information such as fonts, styles, or page layout information.

The metadata portion of an indexing request may specifically be provided by an application providing the indexing request. This might be data such as an identifier for the object, the date or time it was first added to the system, or the identity of the user who manages the object.

A portion of the metadata can be derived metadata. Derived metadata can include metadata inferred from the text content. For example, the filter or code that extracts the text from a PowerPoint presentation might also create metadata about the presentation. In this example, the generated metadata may include the number of slides in the presentation, the title of the file, the name of the presentation author stored in the PowerPoint file, or the size of paper the presentation was designed to print on. More complex examples of derived metadata might include statistical analysis to generate a list of keyword or key concepts in the document, determining the subject person or company of the text, sentiment analysis (the positive or negative tone of the text), or identification of the language in which the text is written. Derived metadata may also include data inferred from processing an object. For example, in processing a PowerPoint presentation, derived metadata may include a timestamp of the time the PowerPoint was processed or the location where the PowerPoint presentation was processed.

An indexing engine can receive an indexing request 510 from an application, distributor or other source. Indexing request 510 specifies an operation to be taken on index 124 for an object and any metadata or text for that action. For context, an application that generates an indexing request may be a corporate document management system, a web site with a search capability such as an online store, or a desktop search program for email.

According to one embodiment, for example, an indexing request can take the form of an indexing object that includes a unique identification for an object, an operation, the metadata or text regions affected and the metadata and/or text for the index. By way of example, but not limitation, indexing operations may include adding, replacing, modifying and deleting information in the index, or combinations thereof. The following provides some exemplary operations that may be included in indexing requests.

AddOrReplace: this operation can be used to create new objects in the index. According to one embodiment, if the object does not exist, it will be created, but if an entry with the same object identification exists, then it will be completely replaced with the new data, equivalent to a delete and add. This function may distinguish between content and metadata. If an object already exists, and metadata only is provided, the existing full text content is retained.

AddOrModify: this operation will update an existing object, or create a new object if it does not already exist. When modifying an existing object, only the provided content and metadata is updated. Any metadata regions that already exist which are not specified in the AddOrModify command will be left intact.

Delete: this operation will remove an object from the index, including both the metadata and the content.

Indexing controller 305, according to one embodiment, is a component which interprets the indexing request 510 to determine how it should be processed. Indexing controller 305 can identify whether a text indexing command exists, and if so, send the command with the necessary parameters to the text update component 315. Indexing controller 305 can likewise determine if any metadata indexing operations are required, and if so, send the command with necessary parameters to the metadata update component 310.

Text update component 315 is responsible for processing requests to index full text content. This may include tasks such as maintaining a dictionary of search terms, maintaining the internal search data structures, and updating the storage representation of the text portion of the search index in memory or on disk as appropriate. Text update component 315 may support instructions such as Add an Object, Replace an Object, or Delete an Object.

Metadata update component 310 is responsible for processing requests to index metadata 312 associated with an object in index 124. This may include building and maintaining dictionaries of search terms, maintaining internal search data structures, and updating the representation of the metadata portion of the search index in memory or on disk as appropriate. Metadata update component 310 may support instructions such as Add an Object, Replace an Object, or Delete an Object.

The embodiment of FIG. 5 is provided by way of example. Indexing engine 220 may include any number of other modules to update and search an index. Indexing engine 220 may be a portion of a larger program, such as a document management program, may be a separate program or may be implemented according any suitable programming architecture. In one embodiment, the processes of indexing engine 220 may be distributed across multiple computer systems.

As discussed above, an index may be partitioned. For example, in order to scale to large sizes, the search index may be broken into partitions. When new objects are added to the search index, a method of determining which partition should be the recipient of the new data is required. For example, one strategy may include allocating partitions based on a modulus of an object ID. As another example, a round-robin technique may be used to add new objects to partitions which have available capacity. One skilled in the art of computing will understand that there may be many possible strategies.

Figure 6:
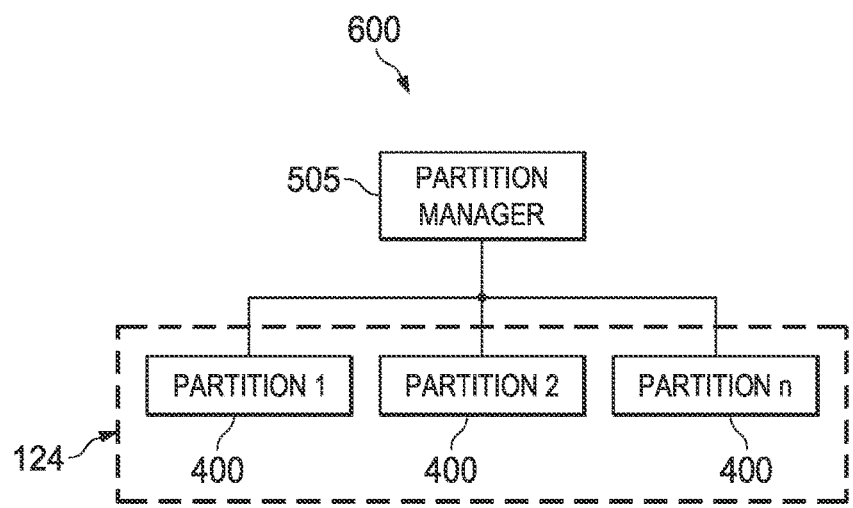
FIG. 6 depicts a diagrammatic representation of one embodiment of an index with multiple partitions connected to and being managed by a partition manager.

FIG. 6 depicts a diagrammatic representation of one embodiment of system 600 for managing partitions. In the embodiment of FIG. 6, index 124 is divided into "n" partitions 400, with each partition including a metadata index and a text index. As illustrated in FIG. 5, in one embodiment, each partition can have its own indexing engine 220 and search module 240.

A partition manager can be configured to manage these partitions. Partition manager 505 is a component of a search system that accepts indexing requests, determines which partition should service an indexing request, and provides the indexing request to the appropriate indexing engine 220. In one embodiment, partition manager 505 can be a logical function of a search engine in the search system which, in turn, can be part of a document management system. In one embodiment, partition manager 505 can be a logical function of distributor 210 shown in FIG. 3. An indexing engine (e.g., indexing engine 220 shown in FIG. 3) for a partition performs the actual indexing operations of adding, deleting or modifying data in the partition. Likewise, partition manager 505 may be able to federate search queries to multiple search engines 240 associated with multiple partitions and combine the results. In one embodiment, this function of partition manager 505 may be incorporated in a federator (e.g., federator 245 shown in FIG. 3).

As people of ordinary skill will understand, in many cases search systems or search engines may employ "stop words" to aid in the search of a corpus of objects. These stop words are usually employed to disregard or remove search terms corresponding to those stop words with respect to submitted search queries. Typically, these stop words are a number of the most commonly occurring terms in a language (e.g., the 500 most commonly occurring words in the English language). Alternatively, these stop words may be reflective of frequency of appearance of terms in the corpus of objects themselves. By creating a list of stop words from the frequency of appearance of terms in the corpus of objects themselves, the list of stop words applied by the search system to terms of search queries may be tailored to the specific corpus being searched.

This approach to creating and applying stop words may be problematic, however, as it does not account for the distribution of terms across objects of the corpus or partitions of the corpus. For example, certain terms may appear quite frequently in a small subset of objects. This may result in the terms being included on the stop word list, despite the term's relatively infrequent appearance across objects. Thus, a term that may nonetheless be useful in searching for particular objects will be added to the stop words list and removed from submitted search queries.

To remedy these issues, in certain embodiments, the search engine 122 may include a stop word list that may be dynamically generated based on the corpus of objects themselves. This stop word list, according to embodiments, may be based on the frequency of appearance of terms in distinct objects. Thus, it may be the number of objects in which a term appears that may be used to assess the frequency of appearance of the term in objects of the corpus, not the overall number of appearances of the term in the corpus (e.g., an appearance of the term in an object counts as only one appearance no matter the number of times the term is utilized in the that object). A set of these terms can then be selected for the stop word list. For example, any term determined to appear more than a certain threshold number of times, or in a threshold percentage of objects (e.g., a term that appears in more than 30% of the document) may be included on the stop word list applied by the search engine 122 to terms of a search query. As another alternative, a number (e.g., the N most frequently appearing terms, where N may be a threshold number that may be configurable) may be included on the stop word list applied by the search engine 122 to terms of a search query. These thresholds may be configurable by an administrator of the search system and may be dependent, for example, on the number of objects in a corpus or partition. Moreover, the stop word list may be dynamic in that it may be generated (or regenerated or updated) at a certain time interval, or based on the growth of the index or corpus of the search system.

In one particular embodiment, a stop word list 316 may be created for each partition 400 of index 124 based on the objects of the corpus of objects associated with that partition 400 of the index. Thus, each stop word list 316 may be specific to the objects of the corpus associated with that partition. A stop word list 316 may be created at some time interval or based on some other condition. For example, a stop word list 316 may be created when an index 124 or partition 400 reaches ten thousand documents, one hundred thousand objects and one million objects. To create such a stop word list 316 for a partition 400 of the index 124, update component 310 (or a separate stop word list update component) may, for each partition 400, access the objects of the corpus corresponding to that partition 400. The terms in those objects indexed by that partition 400 can be determined and the frequency of appearance of each of those terms in the set of objects corresponding to that partition may be evaluated to determine, for each appearing term, the number of objects corresponding to that partition 400 in which the term appears. Again, this frequency of appearance in individual objects indexed in that partition 400 can be used to select the stop words corresponding to that partition 400. For example, terms determined to appear more than a certain threshold number of objects corresponding to that partition, in a threshold percentage of objects corresponding to that partition, or terms appearing in more than a threshold number of objects corresponding to that partition may be included in the stop word list 316 for that partition 400.

By creating a stop word list 316 specific to each partition 400, a number of advantages may be achieved. As indexes in search systems evolve or grow, it is typical that more partitions are typically added. As the use of particular terms and language evolves over time both generally, and within a particular enterprise or environment, the terms of these newly added objects may likewise change. Thus, if the nature of the objects being indexed (e.g., the language of those objects) also changes over time, the newer partitions would include these newer objects (with such new language or different terms). By having a stop word list particular to a partition, each partition (including the newer partitions) may have stop words lists that reflect the particular content and language of the objects indexed by that partition, commensurately improving both the relevance and speed of search queries performed on these partitions when these partition specific stop word lists are applied.

Returning to FIG. 2 then, search queries may be submitted through search interface 230. When a search query is received at search system 101, search engine 122 can search the information in index 124 to identify objects (content) 107 responsive to the search query and return a list or other representation of those objects 107 in response to the received search query. In certain embodiments, search interface 230 may receive queries and provide the query to federator 245. Federator 245 may determine search modules (e.g., processes) 240 to instantiate based on the terms of the received query and instantiate those search modules 240. For example, coordinator 245 may define the search module 240 and a hierarchy in order to define a search tree of the search modules 240 corresponding to the received query. The coordinator 245 may then instantiate search modules 240 and provide each module 240 with the data (e.g., related sub modules 240, search term for the search module 240, etc.) needed to process the search tree. The coordinator 245 may then obtain results from one or more of the search modules 240 (e.g., the search module 240 that is a root node of the search tree) and generate a response to the query received through search interface 230. This response may identify one or more responsive objects. Search modules 240 are responsible for implementing a term process for one or more terms using index 224 or implementing an operator process for a search operator. Thus, a search tree may include a set of hierarchically arranged search modules 240 as nodes of the search tree, each search module 240 being a term process or an operator process.

As discussed above, embodiments as disclosed may provide a search operator (referred to without loss of generality as a TEXT operator) that may address the problem of complex query construction and efficient and effective implementation, among other problems, for finding objects based on a block of text. This TEXT operator may take the form of "TEXT (block of text')". It should be noted here, however, that the TEXT operator may take almost any form or syntax desired and be utilized with other operators traditionally used with search queries as are known in the art. Other variations on operators, syntaxes and uses are imaginable and fully contemplated herein.

Thus, to continue with the example above, using the TEXT operator, a search for the example block of text may be:

TEXT(Call me Ishmael. Some years ago—never mind how long precisely—having little or no money in my purse, and nothing particular to interest me on shore, I thought I would sail about a little and see the watery part of the world. It is a way I have of driving off the spleen and regulating the circulation)

Other examples of searches that may include such a TEXT operator may be:
Select "OTObject" where text(hi)
Select "OTObject" where text(555-1834-1845)
Select "OTObject" where "A" and Text(It was the best of times, it was the worst of times, it was the age of reason, . . . )

Select "OTObject" where "A" and "B" OR TEXT("To whom it may concern I dunno what's going on (but I like it\)) OR Text(hi mom")

If such a TEXT operator is specified in a received search query, coordinator 245 may instantiate a search module 240 corresponding to the TEXT operator as a node in the search tree and a set of search modules 240 based on the terms of the received query. For example, coordinator 245 may define the search module 240 and a hierarchy in order to define a search tree of the search modules 240 corresponding to the received query (or the portion of thereof corresponding to the TEXT operator). The portion of the search tree defined by the federator 245 may include a TEXT operator search module 240 as a node in the search tree where that TEXT operator search module 240 has one or more search modules 240 as a sub-node for terms or other operators associated with the TEXT operator in the search query.

Figure 7:
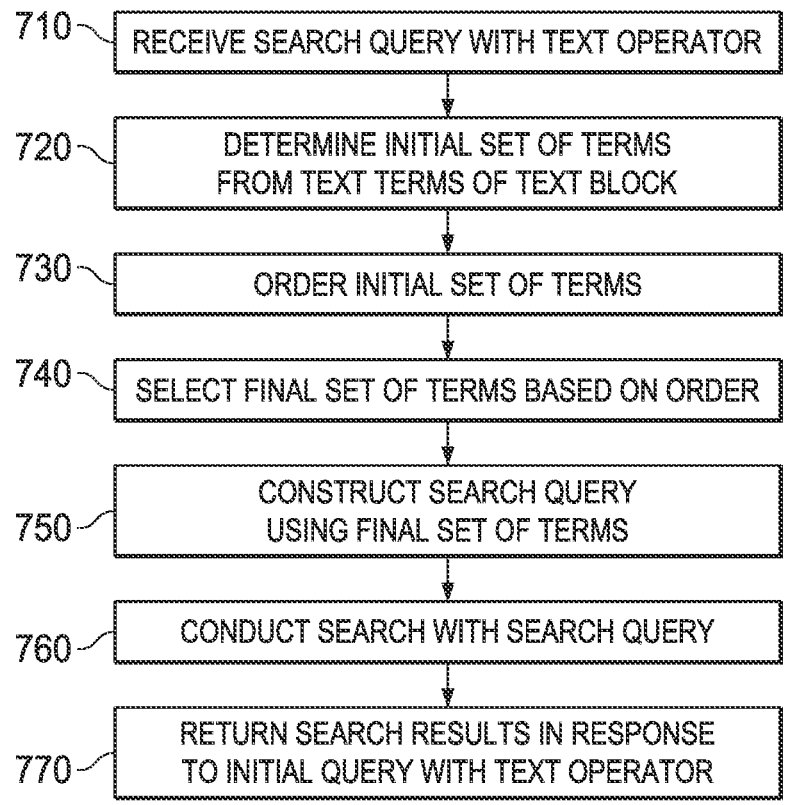
FIG. 7 is a flow diagram of one embodiment of a method for implementing a TEXT operator.

Moving now to FIG. 7, a flow diagram for one embodiment of a method for implementing a search for a search query including a TEXT operator is depicted. Such a method may, for example, be utilized by a search module of a search system to implement a search query, or portion thereof, that includes a TEXT operator and an associate block of text. For example, one embodiment of such a method may re-form a TEXT operator of a search query into a search query containing one or more operators including selected terms or phrases from the block of text included in the TEXT operator.

Initially, at step 710, the search query having the TEXT operator may be received, including the block of text specified in that TEXT operator. This block of text includes a set of text terms (e.g., individual words, numbers, symbols, etc.). At step 720, an initial set of terms is determined from the block of text and, at step 730, the determined initial set of search terms may be ordered.

Specifically, in certain embodiments, a search system may include a set of preselection rules, methods or models (collectively rules) for determining the initial set of terms or ordering the initial set of terms for usefulness. For example, in one embodiment, a set of phrasing rules (e.g., statistic or semantic models) may be applied to the text terms of the block of text to extract statistically or semantically interesting phrases. To continue with the above example, the phrases "nothing particular" or "never mind" may be extracted from the text terms of the block of text submitted in the TEXT search query. Such phrases may be included in the initial set of terms in addition to, or in lieu of, the text terms that comprise the phrase itself. Other preselection rules for determining or selecting an initial set of terms from the text terms of the submitted text block may also be utilized, including adding synonyms of text terms to the initial set of terms, adding phonetic matches or homophones to the initial set of terms based on the text terms, using semantic enrichment or thesauri to add terms to the initial set of terms based on the set of text terms or adding spelling variations to the initial set of words based on the text terms of the text block. Other rules, methods or models may also be utilized to determine the initial set of terms from the text terms of the block of text, and are fully contemplated herein.

Once the initial set of terms is determined, this initial set of terms may be ordered. The ordering rules of the preselection rules may be used to evaluate the initial set of terms to determine where they should be ordered. As but one example of an ordering rule, statistically or semantically interesting phrases (e.g., initial terms) may be given relatively high ordering. As another example, initial terms that are in the stop word list may be placed relatively lower in the order. As will be realized from a review of the discussion herein, the initial terms of a query may be assigned and ordered differently based on the partition on which the search is begin executed (e.g., because the stop word list associated with each partition may be different). Similarly, words that are longer than some threshold length or shorter than some threshold length (e.g., "ago") may be ordered relatively lower or eliminated altogether.

As another example of a preselection ordering rule, numbers within the text terms may be ordered based on the frequency of numbers within the set of text terms or eliminated altogether. If there are many numbers in the text terms, numbers of the initial set of terms may be assigned relatively lower orders, while if there are fewer numbers in the text terms, numbers within the initial set of terms may be ordered relatively higher. Thus, preselection rules corresponding to numbers may adjust the order of numerical terms based on the frequency of appearance of numbers in the set of text terms in the text block of the query. It will be noted again, that these preselection rules are given by way of example, other and different preselection rules, methods or models may be used for the ordering of an initial set of terms and these preselection rules may be configurable or altered by an administrator of the search system in various embodiments.

Once the initial set of terms are ordered, at step 740, a final set of search terms can be selected from the initial set of search terms based on the ordering. While the final set of search terms could include all of the initial set of search terms, to increase efficiency of the search and utilize fewer resources of the search system while still ensuring accuracy of the search, a reduced number (subset) of the initial search terms may be selected as the final set of search terms. The selection rules for selecting the final set of search terms may be configurable and may include a rule specifying that a number of the initial set of terms with the highest order may be select. Alternatively, a target minimum or maximum number of the initial set of terms may be specified by the term selection rules such that a number of the initial terms between the minimum and maximum may be selected from the initial set of terms. Other rules, methods or models for selecting a reduced number of the initial search terms as the final set of search terms may be utilized and are fully contemplated herein.

In one specific embodiment, the block of text of the search query may be parsed into tokens (e.g., contiguous strings of characters) to determine the set of text terms. To determine the initial set of search terms, in this parsing, mixed text terms (e.g., both alpha and numeric) may be ignored along with any "<tag>"s. Text terms that are longer than a shorter length boundary (e.g., 5 characters) and less than a longer length boundary (e.g., 17 characters), plus a count of how many times the text term occurs in the block of text, may be stored in memory as initial search terms. Additionally, every phrase comprising two text terms in sequence in the block of text where each text term has greater than the shorter length boundary characters and less than the longer length boundary characters may be stored in memory as an initial search term along with how many times that phrase appears in the block of text. This step serves to remove part-numbers, numbers, tags, and random sequences of characters (which may actually be quite common in converted text) from the initial set of search terms. The shorter length boundary (e.g., less than 5 characters) is used to remove text terms that tend to have very long postings lists to improve search performance of resultant queries. The longer length boundary (e.g., greater than 17 characters) is used to remove "garbage" text terms from consideration. Although long words do occur in languages, in most cases they tend to be nonsense words in converted text.

Additional preselection rules may also be applied. For example, if the number of text terms is less than 256 characters then allow numbers to remain in the text terms. This may be useful in searches for part-numbers or phone numbers but eliminates using numbers from spread-sheets or tables. As another example, if the number of text terms is less than some threshold upper limit (e.g., after numerical terms are removed), numbers may be re-introduced into the set of text terms. Any text terms or phrases stored in memory that include a stop word (as described above) can be eliminated and the remaining initial search terms (e.g., the text terms and phrases stored in memory) can then be ordered by associated count. A top number of the initial search terms (e.g., the top 15 initial search terms) that have the highest occurrence may then be selected as the final set of search terms.

A search query can then be constructed using the final set of search terms at step 750 and a search with this constructed search query conducted at step 760. This second search query using the final set of search terms may be implemented using Boolean search operators as are typical, such as AND or search operators. By virtue of having reduced the set of terms from the text terms of the text block and formulating a well formed search query from these terms, this second search query may execute more quickly and efficiently than if a search was conducted using the original text block submitted to the search system.

In some case, however, it may be desired to further increase the efficiency of such searches while improving the accuracy of such searches by using a subset operator. A subset operator may be a search operator that addresses the problem of complex query construction for finding objects that include some number (N) of a set of terms (M). This subset operator may take almost any form desired and be utilized with other operators traditionally used with search queries as are known in the art. The subset operator may utilize almost any syntax desired to specify a search for a number of terms. For example, "Subset ([N], term 1, term 2 . . . term M)" may specify that for that search (or portion of a search) an object is responsive if it contains at least N of the M terms if N is a positive number. If N is a negative number such a search could specify that an object is responsive if it matches at least all but N terms. If N is a percentage (e.g., 20%) such a search could specify that an object is responsive if it matches that percentage or more (rounded to the nearest lower or higher whole number) of the M terms.

The M terms can be any expressions supported by the search system, which might include words, phrases, regular expressions, ranges, stemming, thesaurus, etc. For simplicity, variations of the subset operator (e.g., different operators) could be used to specify list of terms using stemmed values or other operations. Further extensions could incorporate other common search features, such as proximity. For example, the operator "termset" used in the following syntax might specify exact matches: "termset(3, home, house, "domestic dwelling", "primary residence")". The operator "stemset" used in the following syntax might include variations based on stemming or plurals: stemset(20%, car, truck, motorcycle, van, minivan, pickup, jeep, suv, "sport utility vehicle"). Examples of subset operators and their efficient implementation will be described at a later point here.

Thus, to construct a search using such a subset operator, the final set of terms may be included in such a subset operator with a desired percentage or threshold for N. This threshold for N may be configurable by, for example, an administrator of the search system or a user who originally submitted a search. If the final set of search terms is empty, the initial TEXT operator with the block of text may be written into stemset("80%", all) where "all" is a short-form that means match all documents. Continuing with the example above, however, a search using a final set of terms may be constructed:

Stemset(80% Ishmael,"never mind",precisely, purse, "nothing particular",interest,shore,thought,sail, watery,world,driving,spleen,regulating,circulation)

Essentially, this query requests that any text which contains 80% or more of the words and phrases in this list is a match. The number of terms and phrases which are processed has been reduced from 58 in the original query including the TEXT operator to about 15. This reduction, combined with the efficient subset search operator, results in a query which executes quickly regardless of the size of the initial keyword set, while keeping high levels of accuracy. The ability to specify some percentage of the provided terms is key to facilitating similarity searches.

Once objects responsive to the submitted query containing the final set of search terms are determined, the resulting objects, or identification thereof, may be returned in response to the initially received query that contained the TEXT operator and text block at step 770.

It may now be useful to an understanding of certain embodiments to discuss the implementation of embodiments of a subset operator in more detail. Embodiments will be better understood with reference to U.S. patent application Ser. No. 15/331,327 filed Oct. 21, 2016 by Inventors Pidduck and Tausky and entitled "System and Method for Subset Searching and Associated Search Operators" which is hereby incorporated fully herein in its entirety for all purposes. To aid with an illustration of embodiments of a subset operator, consider the following example: a document should be classified as "Watershed" (e.g., responsive to a document request for Watershed documents) if the document contains at least 5 of the following terms:

Water,river,lake,pond,stream,creek,rain,rainfall,dam

Instead of relying on relevancy scores as determined by certain search systems, in certain instances it may be desired to construct an explicit search query to find five or more of these terms, which is extremely difficult for a typical user to construct. Using traditional unary and binary operators, the unreduced example query might look like this:

SELECT . . . WHERE (stream AND pond AND lake AND river AND water) OR
(creek AND pond AND lake AND river AND water) OR
(creek AND stream AND lake AND river AND water) OR
(creek AND stream AND pond AND river AND water) OR
(creek AND stream AND pond AND lake AND water) OR
(creek AND stream AND pond AND lake AND river) OR
(rain AND pond AND lake AND river AND water) OR
(rain AND stream AND lake AND river AND water) OR
(rain AND stream AND pond AND river AND water) OR
(rain AND stream AND pond AND lake AND water) OR
(rain AND stream AND pond AND lake AND river) OR
(rain AND creek AND lake AND river AND water) OR
(rain AND creek AND pond AND river AND water) OR
(rain AND creek AND pond AND lake AND water) OR
(rain AND creek AND pond AND lake AND river) OR
(rain AND creek AND stream AND river AND water) OR
(rain AND creek AND stream AND lake AND water) OR (rain AND creek AND stream AND lake AND river) OR
(rain AND creek AND stream AND pond AND water) OR
(rain AND creek AND stream AND pond AND river) OR
(rain AND creek AND stream AND pond AND lake) OR
(rainfall AND pond AND lake AND river AND water) OR
(rainfall AND stream AND lake AND river AND water) OR
(rainfall AND stream AND pond AND river AND water) OR
(rainfall AND stream AND pond AND lake AND water) OR
(rainfall AND stream AND pond AND lake AND river) OR
(rainfall AND creek AND lake AND river AND water) OR
(rainfall AND creek AND pond AND river AND water) OR
(rainfall AND creek AND pond AND lake AND water) OR
(rainfall AND creek AND pond AND lake AND river) OR
(rainfall AND creek AND stream AND river AND water) OR
(rainfall AND creek AND stream AND lake AND water) OR
(rainfall AND creek AND stream AND lake AND river) OR
(rainfall AND creek AND stream AND pond AND water) OR
(rainfall AND creek AND stream AND pond AND river) OR
(rainfall AND creek AND stream AND pond AND lake) OR
(rainfall AND rain AND lake AND river AND water) OR
(rainfall AND rain AND pond AND river AND water) OR
(rainfall AND rain AND pond AND lake AND water) OR
(rainfall AND rain AND pond AND lake AND river) OR
(rainfall AND rain AND stream AND river AND water) OR
(rainfall AND rain AND stream AND lake AND water) OR
(rainfall AND rain AND stream AND lake AND river) OR
(rainfall AND rain AND stream AND pond AND water) OR
(rainfall AND rain AND stream AND pond AND river) OR
(rainfall AND rain AND stream AND pond AND lake) OR
(rainfall AND rain AND creek AND river AND water) OR
(rainfall AND rain AND creek AND lake AND water) OR
(rainfall AND rain AND creek AND lake AND river) OR
(rainfall AND rain AND creek AND pond AND water) OR
(rainfall AND rain AND creek AND pond AND river) OR
(rainfall AND rain AND creek AND pond AND lake) OR
(rainfall AND rain AND creek AND stream AND water) OR
(rainfall AND rain AND creek AND stream AND river) OR
(rainfall AND rain AND creek AND stream AND lake) OR
(rainfall AND rain AND creek AND stream AND pond) OR
(dam AND pond AND lake AND river AND water) OR
(dam AND stream AND lake AND river AND water) OR
(dam AND stream AND pond AND river AND water) OR
(dam AND stream AND pond AND lake AND water) OR
(dam AND stream AND pond AND lake AND river) OR
(dam AND creek AND lake AND river AND water) OR
(dam AND creek AND pond AND river AND water) OR
(dam AND creek AND pond AND lake AND water) OR
(dam AND creek AND pond AND lake AND river) OR
(dam AND creek AND stream AND river AND water) OR
(dam AND creek AND stream AND lake AND water) OR
(dam AND creek AND stream AND lake AND river) OR
(dam AND creek AND stream AND pond AND water) OR
(dam AND creek AND stream AND pond AND river) OR
(dam AND creek AND stream AND pond AND lake) OR
(dam AND rain AND lake AND river AND water) OR
(dam AND rain AND pond AND river AND water) OR
(dam AND rain AND pond AND lake AND water) OR
(dam AND rain AND pond AND lake AND river) OR
(dam AND rain AND stream AND river AND water) OR
(dam AND rain AND stream AND lake AND water) OR
(dam AND rain AND stream AND lake AND river) OR
(dam AND rain AND stream AND pond AND water) OR
(dam AND rain AND stream AND pond AND river) OR
(dam AND rain AND stream AND pond AND lake) OR
(dam AND rain AND creek AND river AND water) OR
(dam AND rain AND creek AND lake AND water) OR
(dam AND rain AND creek AND lake AND river) OR
(dam AND rain AND creek AND pond AND water) OR
(dam AND rain AND creek AND pond AND river) OR
(dam AND rain AND creek AND pond AND lake) OR
(dam AND rain AND creek AND stream AND water) OR
(dam AND rain AND creek AND stream AND river) OR
(dam AND rain AND creek AND stream AND lake) OR
(dam AND rain AND creek AND stream AND pond) OR
(dam AND rainfall AND lake AND river AND water) OR
(dam AND rainfall AND pond AND river AND water) OR
(dam AND rainfall AND pond AND lake AND water) OR
(dam AND rainfall AND pond AND lake AND river) OR
(dam AND rainfall AND stream AND river AND water) OR
(dam AND rainfall AND stream AND lake AND water) OR
(dam AND rainfall AND stream AND lake AND river) OR
(dam AND rainfall AND stream AND pond AND water) OR
(dam AND rainfall AND stream AND pond AND river) OR
(dam AND rainfall AND stream AND pond AND lake) OR
(dam AND rainfall AND creek AND river AND water) OR
(dam AND rainfall AND creek AND lake AND water) OR
(dam AND rainfall AND creek AND lake AND river) OR
(dam AND rainfall AND creek AND pond AND water) OR
(dam AND rainfall AND creek AND pond AND river) OR
(dam AND rainfall AND creek AND pond AND lake) OR
(dam AND rainfall AND creek AND stream AND water) OR
(dam AND rainfall AND creek AND stream AND river) OR
(dam AND rainfall AND creek AND stream AND lake) OR
(dam AND rainfall AND creek AND stream AND pond) OR
(dam AND rainfall AND rain AND river AND water) OR
(dam AND rainfall AND rain AND lake AND water) OR (dam AND rainfall AND rain AND lake AND river) OR
(dam AND rainfall AND rain AND pond AND water) OR
(dam AND rainfall AND rain AND pond AND river) OR
(dam AND rainfall AND rain AND pond AND lake) OR
(dam AND rainfall AND rain AND stream AND water) OR
(dam AND rainfall AND rain AND stream AND river) OR
(dam AND rainfall AND rain AND stream AND lake) OR
(dam AND rainfall AND rain AND stream AND pond) OR
(dam AND rainfall AND rain AND creek AND water) OR
(dam AND rainfall AND rain AND creek AND river) OR
(dam AND rainfall AND rain AND creek AND lake) OR
(dam AND rainfall AND rain AND creek AND pond) OR
(dam AND rainfall AND rain AND creek AND stream)

The above query contains 629 binary operators and 630 term operators. In certain cases, it may be possible to optimize the query to the following query:

SELECT . . . WHERE (water AND river AND lake AND pond AND (stream OR creek OR
rain OR rainfall OR dam)) OR
(water AND river AND lake AND stream AND (creek OR rain OR rainfall OR dam)) OR
(water AND river AND lake AND creek AND (rain OR rainfall OR dam)) OR
(water AND river AND lake AND rain AND (rainfall OR dam)) OR
(water AND river AND lake AND rainfall AND dam) OR
(water AND lake AND pond AND stream AND (creek OR rain OR rainfall OR dam)) OR
(water AND lake AND pond AND creek AND (rain OR rainfall OR dam)) OR
(water AND lake AND pond AND rain AND (rainfall OR dam)) OR
(water AND lake AND pond AND rainfall AND dam) OR
(water AND pond AND stream AND creek AND (rain OR rainfall OR dam)) OR
(water AND pond AND stream AND rain AND (rainfall OR dam)) OR
(water AND pond AND stream AND rain AND dam) OR
(water AND stream AND creek AND rain AND (rainfall OR dam)) OR
(water AND stream AND creek AND rainfall AND dam) OR
(water AND creek AND rain AND rainfall AND dam) OR
(river AND lake AND pond AND stream AND (creek OR rain OR rainfall OR dam)) OR
(river AND lake AND pond AND creek AND (rain OR rainfall OR dam)) OR
(river AND lake AND pond AND rain AND (rainfall OR dam)) OR
(river AND lake AND pond AND rain AND dam) OR
(river AND pond AND stream AND creek AND (rain OR rainfall OR dam)) OR
(river AND pond AND stream AND rain AND (rainfall OR dam)) OR
(river AND pond AND stream AND rainfall AND dam) OR
(river AND stream AND creek AND rain AND (rainfall OR dam)) OR
(river AND stream AND creek AND rainfall AND dam) OR
(river AND creek AND rain AND rainfall AND dam)) OR
(lake AND pond AND stream AND creek AND (rain OR rainfall OR dam)) OR
(lake AND pond AND stream AND rain AND (rainfall OR dam)) OR
(lake AND pond AND stream AND rainfall AND dam) OR
(lake AND stream AND creek AND rain AND (rainfall OR dam)) OR
(lake AND stream AND creek AND rainfall AND dam) OR
(lake AND creek AND rain AND rainfall AND dam)) OR
(pond AND stream AND creek AND rain AND (rainfall OR dam)) OR
(pond AND stream AND creek AND rainfall AND dam) OR
(stream AND creek AND rain AND rainfall AND dam)

However, even in this case such a search may still use 205 term iterators and 205 binary iterators. In practice, a search query may have many other criteria (dates, metadata values, other text terms, etc.) As one can imagine, creating search queries for more complex scenarios will quickly exceed a (searching) user's capacity to easily and correctly build a search query. This problem arises in no small part because in a binary tree approach to implementing a search, each binary operator of the search tree may be a node that includes two sub-nodes, where each of these sub-nodes may be either another operator node or may include a search term node (e.g., as a leaf node). Thus, traditional search engines construct search trees made up of unary or binary iterators in the tree and term iterators at the leaves of the tree. Each term iterator scope is limited to one term and each binary operator process is limited to two terms. Such constraints lead to extremely complex queries, even for a small number of terms.

Accordingly, the implementation of such search queries by typical search engines may consume large quantities of time, memory or other computer resources. In some cases, for certain queries, the resources required for a particular query may exceed the computing resources available or may require that certain computing resources by taken off-line and dedicated to the search in order to complete such a search. At least in part this situation may result from the manner in which these types of searches are implemented by typical search engines. As mentioned, most search engines function by evaluating a search using a binary tree approach where binary search operators are involved. To illustrate in more detail, almost all search engines (e.g., full text search engines) maintain an index. This index may include, for example, an inverted copy of the indexed information. So, for example, assume that the corpus of documents being indexed includes three documents with the following values in a "Name" field:

Object 1—"Water, Rivers and Lakes"
Object 2—"Rivers, Dams and Rainfall"
Object 3—"Rivers and Ponds"

For the above example, an inverted index (also called the posting list) for the "Name" field may look similar to:

And—1, 2, 3
Rivers—1, 2, 3
Lakes—1
Rainfall—2
Ponds—3
Water—1
Dams—2

Such an index indicates that the term "And" appears in objects 1, 2 and 3, the term "rivers" appears in objects 1, 2 and 3, the term "lakes" appears in object 1, the term "Ponds" appears in object 3, etc.

Figure 8A:
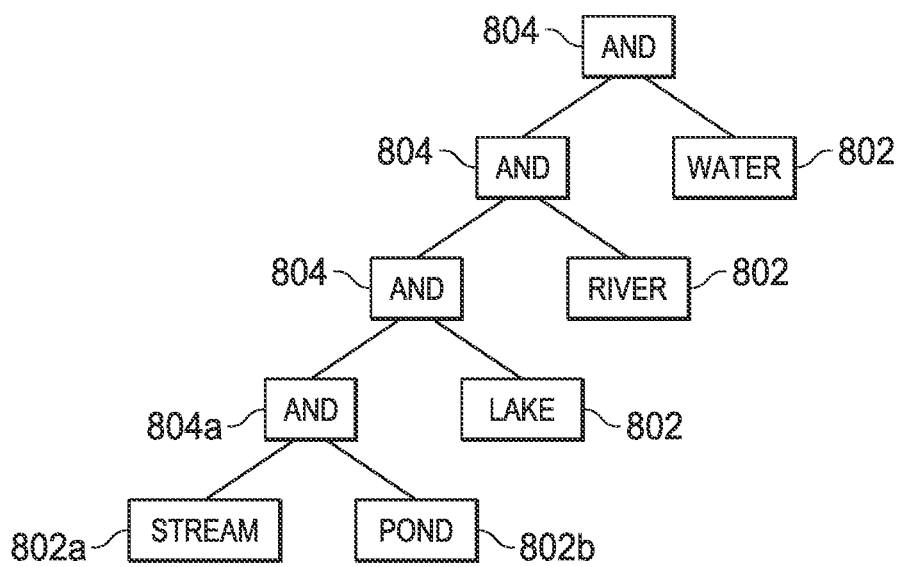
FIGS. 8A and 8B depict example search trees.

FIG. 8A depicts a representation of an example search tree for the search "(stream AND pond AND lake AND river AND water)". Here, each term node 802 represents a process that searches, determines and provides objects of the corpus that includes the labeled term. In other words, a process may access the index to determine which objects of the corpus include that search term. For example, term node 802a represents access to the index to identify objects that include the term "stream". Similarly, term node 802b represents access to the index to identify objects that include the term "pond." Operator node 804a represents that a process will union or otherwise combine the objects returned by the process associated with term node 802a and the process associated with term node 802b to determine the objects that contain both the term "stream" and the search term "pond". As can be seen, the search "(stream AND pond AND lake AND river AND water)" requires at least five term processes 802 for the search terms and four binary operator processes 804 for each of the operator.

Figure 8B:
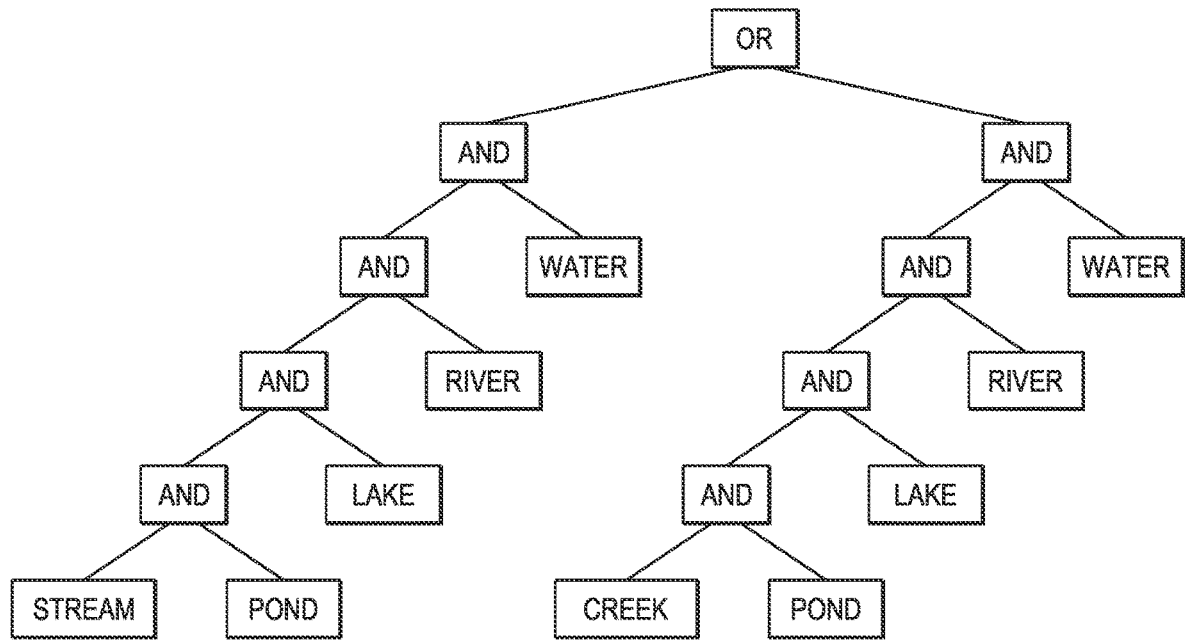

As can be imagined from the depiction of this simple search, the associated number of processes, associated computer power, memory, time, etc., quickly become untenable when discussing search queries like those enumerated above. To illustrate further, FIG. 8B is a block diagram depicting a representation of an example search tree for the search "(stream AND pond AND lake AND river AND water) OR (creek AND pond AND lake AND river AND water)". As can be seen, the search tree may grow exponentially based on the number of operators or permutations involved in the search, despite that the number of actual terms involved (e.g., water, river, lake, pond, stream, creek, rain, rainfall, dam) may be constant and relatively few in number.

Accordingly, embodiments of the systems and methods herein allow simple specification of searches to find a set of matching terms and that efficiently implement such searches. Specifically, embodiments as disclosed may utilize a subset operator that may address the problem of complex query construction, among other problems, for finding objects that include some number (N) of a set or terms (M). Moreover, embodiments as disclosed herein may efficiently implement the searches specified by such subset operators using a subset process that may combine results from a set of term processes where only one term process may be needed for each search term (or search term variant).

Figure 8C:
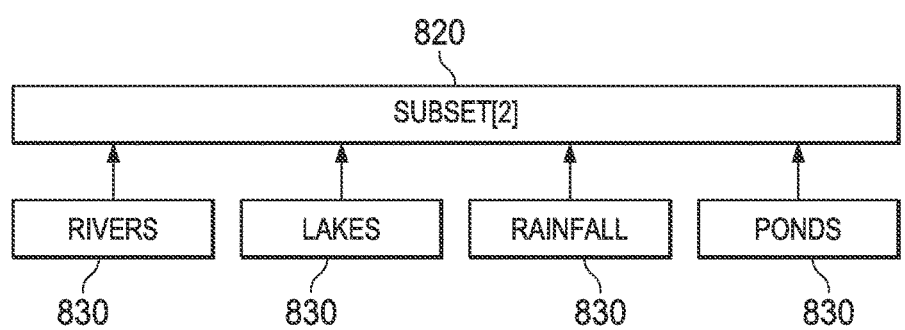
FIG. 8C depicts one example of a search tree for an example use of a subset operator.

Such subset operators may, for example, take the form of Subset ([N], term 1, term 2 . . . term M). Thus, a representation of the above example query may be "subset(5, water, river, lake, pond, stream, creek, rain, rainfall, dam)." In other words, find any objects that contain at least five of the terms: water, river, lake, pond, stream, creek, rain, rainfall, dam. A subset process may combine results from multiple term processes. Specifically, in most cases the subset process will utilize order M term processes for M search terms and combine the results from these term processes to return objects that have N of those M terms. For example, FIG. 8C depicts an example search tree for the search "subset(2, rivers, lakes, rainfall, ponds)". Here, there is one operator process 820 (the subset process) and four term processes 830, one for each term.

By implementing such a subset process, the N of M search problem may be solved efficiently at the process and search tree level as opposed to at the query level (e.g., by expanding or constructing such a query manually). Thus, using such a subset process subset matching may be implemented in a manner that would be impossible to do at a query construction level. For example, matching five of nine terms using the subset process yields a search tree with a mere ten processes (one subset process and nine term processes). Using conventional methods, the same query would use over 1200 iterators (un-optimized) or over 400 iterators (optimized).

Accordingly, embodiments may avoid the need to execute such huge queries and provide many technical improvements in the functioning of the computer when applying such subset searching, including the use of fewer computer resources such as memory or processor cycles and may require less time to execute. Moreover, embodiments of such search operators may be usefully applied in a variety of contexts, including in constructing a search query using a final set of search terms for a TEXT operator.

Returning then to FIG. 3, as discussed, a search module 240 may be implemented as an iterator. An iterator may be a process that returns a next object of the type of object for which the iterator is configured. Thus, an iterator may provide an interface or call (e.g., collectively referred to as a "next interface") to allow a requestor (e.g., another search module 240 higher in the search tree or the coordinator) to access the interface of that iterator and obtain the next object of the corpus that is responsive to the configuration of that iterator. For example, a search term iterator for a term may provide a next interface that provides the next object in the corpus that contains that search term. An operator iterator may provide a next interface that provides the next object in the corpus that meets the logical condition(s) specified by that operator with respect to the search terms associated with that operator. An iterator may maintain a pointer or other indicator that maintains an identifier of the iterator's current position in the corpus such that it is the next responsive object in the corpus that is returned with each next call or a null indication if the iterator has reached the end of the corpus without identifying a subsequent document responsive to the configuration of that iterator.

In one embodiment then, search interface 230 may allow a user to use a subset operator in a search query. This subset operator may take almost any form desired and be utilized with other operators traditionally used with search queries as are known in the art. The subset operator may utilize almost any syntax desired to specify a search for a number of terms. For example, "Subset ([N], term 1, term 2 . . . term M)" may specify that for that search (or portion of a search) an object is responsive if it contains at least N of the M terms if N is a positive number. If N is a negative number, such a search could specify that an object is responsive if it matches at least all but N terms. If N is a percentage (e.g., 20%), such a search could specify that an object is responsive if it matches that percentage (rounded to the nearest lower or higher whole number) of the M terms.

The M terms can be any expressions supported by the search system, which might include words, phrases, regular expressions, ranges, stemming, thesaurus, etc. For simplicity, variations of the subset operator (e.g., different operators) could be used to specify a list of terms using stemmed values or other operations. Further extensions could incorporate other common search features, such as proximity. For example, the operator "termset" used in the following syntax might specify exact matches: "termset(3, home, house, "domestic dwelling", "primary residence")". The operator "stemset" used in the following syntax might include variations based on stemming or plurals: stemset(20%, car, truck, motorcycle, van, minivan, pickup, jeep, suv, "sport utility vehicle").

Other variations on operators, syntaxes and uses are imaginable and contemplated herein. For example, while embodiments have generally been presented as finding a minimum of N items in a set of M (e.g., a minimum of five, but objects with six terms would also meet the search criteria), other embodiments may be used to find objects with exactly N of M items (e.g., "exactsubset ([N], term 1, term 2 . . . term M)"). Another embodiment may allow a search operator and corresponding search for objects which do not have N of M terms (or which have at most N−1 of the M terms, etc.). Such a search term may, for example, take the form "not subset (2, pond, lake, river, stream)" or have a separate search operator such as: "fewerthan (3, pond, lake, river, stream)", etc. Other variations, syntaxes and uses are also possible.

If such a subset operator is specified in a received search query, federator 245 may instantiate a search module 240 corresponding to the subset operator as a node in the search tree and a set of search modules 240 based on the terms of the received query. For example, federator 245 may define the search module 240 and a hierarchy in order to define a search tree of the search modules 240 corresponding to the received query (or the portion of thereof corresponding to the subset operator). The portion of the search tree defined by the federator 245 may include a subset operator search module 240 as a node in the search tree where that subset operator search module 240 has a term search module 340 as a sub-node for each term associated with the subset operator in the search query.

To illustrate an example, referring briefly back to FIG. 8C, a search tree for the query "subset(2, rivers, lakes, rainfall, ponds)" is depicted. Here, operator process 820 may be a subset operator instantiated by search module 240 and each term processes 830 may be a term search module 240 that is a sub-node of the subset operator search module 240 (e.g., implementing operator process 820).

Referring again to FIG. 3, in one embodiment, a subset operator search module 340 may be implemented as an iterator. As used in a search tree such a subset iterator may have a number of sub-nodes, each sub-node corresponding to a term iterator for one of the (M) search terms associated with the subset operator in the original query. The subset iterator may have a threshold value (N) corresponding to the original query such that the subset iterator will return an object (or identifier thereof) in response to a call to the next interface of the subset iterator if the object includes N or more of the M terms based on the objects (or identifiers thereof) returned by the sub-node term iterators.

Figure 9:
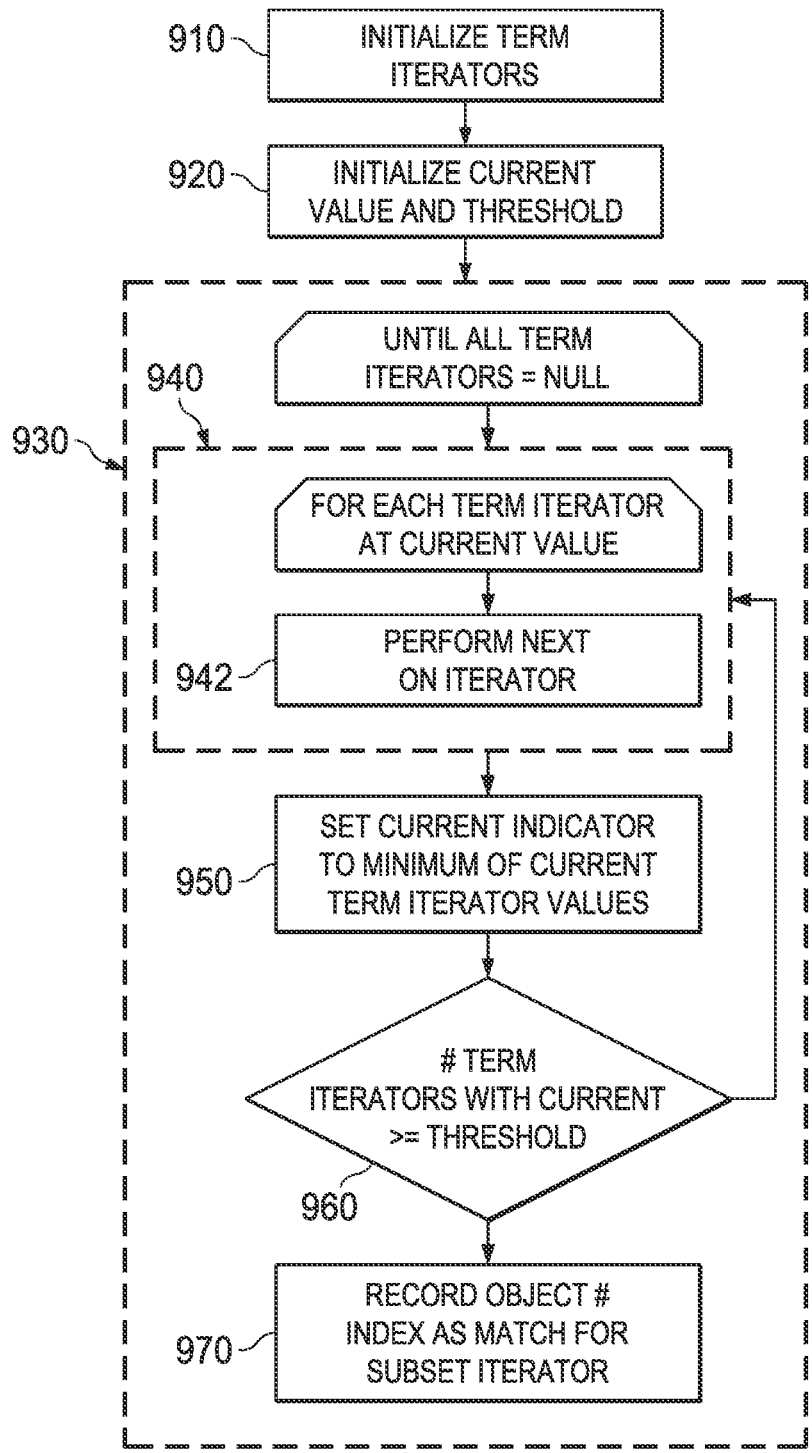
FIG. 9 is a flow diagram depicting one embodiment of a method for a subset iterator.

Referring now to FIG. 9, one embodiment of a method for a subset iterator is depicted. For purposes of explanation with respect to this embodiment, it will be noted that a subset iterator employing the method of this embodiment will have some number (M) of sub-nodes, each sub-node including a term iterator. Each term iterator has access to an index of a corpus of objects where each object is associated with an identifier. The identifiers of the objects are sequential and the term iterator maintains an indicator of a current object (which may be initialized) and returns the next document in the sequence (e.g., the next document including the term with a higher identifier than the current indicator, assuming the identifiers are increasing in value) in response to a call to the term iterator's next interface if such an object exists, and an indicator that no more data remains otherwise (e.g., NULL, end, EOF, a particular count, a value storing the last offset, simply running out of data, etc.). For purposes of illustration with this embodiment, it will be assumed objects have sequential numerical identifiers greater than zero.

At step 910, the term iterators that are sub-nodes of the subset iterator may be initialized by setting the current object indicator of each of the term iterators to zero. Additionally or alternatively at step 910, a current object indicator for each term iterator may be tracked or maintained by the subset iterator and this current object indicator maintained by the subset iterator may be initialized to zero. Similarly, at step 920, the current indicator of the subset iterator may also be set to zero. Additionally, at step 920, a threshold number of terms may be set for the subset iterator. This threshold may be equal to the number of terms (N) designated for the subset operator in an original query containing the corresponding subset operator.

Loop 930 may be performed until each of the term iterators (or greater than M minus N iterators) return NULL in response to a call to their next interfaces. In loop 940, a call is made to the next interface of each of the sub-node term iterators whose current value is equal to the current value of the subset iterator at step 942. This call will serve to return, for each of the term iterators, an identifier for the next object that contains the term associated with that iterator. The current object indicator for the respective term iterators can then be updated with the values returned from the respective next call to that term iterator. The current indicator of the subset iterator may then be set to the minimum (e.g., smallest) identifier of all the current object indicators for all of the term iterators at step 950.

At step 960, it can then be determined if a number of current object indicators for the term iterators that are equal to the current indicator for the subset iterator (if any) is equal to or greater than the threshold (N) configured for the subset iterator. If the number of current indicators for the term iterators that are equal to the current indicator for the subset iterator is equal to or greater than the threshold at step 960, the object associated with the value of the current subset indicator (e.g., where the current subset indicator is an identifier for that object) may be identified as responsive to the original query (or portion of query). This current subset indicator (e.g., identifier) may then be recorded as an identifier of a matching object at step 970. This identifier can also be returned (e.g., in response to a next call to the subset iterator). Loop 930 can then proceed by returning to loop 940. Alternatively, the subset iterator may halt or otherwise suspend until another next call is received, at which point loop 930 can then proceed by returning to loop 940.

Expressed in pseudocode, embodiments of a method for a subset iterator such as that discussed that operate according to a loop that identifies all objects matching a subset operator in search may be:

```
/********************/
SubsetIterator(threshold) {
Set all iterator values to 0
LOW=0
   {
      UNTIL each iterator >= end
      For each iterator with value of LOW {
         Advance iterator to NEXT value
      }
      LOW = minimum of the iterator values
      IF number of iterators with value of LOW >= threshold {
         RECORD MATCH for value LOW
      }
   }
}
/********************/
```

Embodiments of a method for a subset iterator such as that discussed that operate to identify the next object matching a subset operator in a search as expressed in pseudocode may be:

```
MAIN {
    Set all iterator values to 0
    LOW=0
    UNTIL done
        Call GET_NEXT_MATCH
        If response is not done, record value LOW as a match
}
Function GET_NEXT_MATCH {
    UNTIL each iterator >= end
        For each iterator with value of LOW {
            Advance iterator to NEXT value
        }
        LOW = minimum of the iterator values
        IF number of iterators with value of LOW >= threshold {
            RETURN value LOW
        }
    }
    Return done
}
```

It will be helpful to an understanding of certain embodiments to illustrate an embodiment with respect to a specific example. Referring now to FIG. 10, a table representing an inverted index of an example corpus of 34 objects with object identifiers (ID) 1-34. This table provides a representation of the inverted index for five words in a data set: rivers, lakes, rainfall, ponds, stream. The column on the left, labeled "ID", is the unique identifier for the object. Reading across the table, Object 1 contains the words "rivers" and "rainfall". Object 2 contains the words "rainfall" and "stream", etc.

Reading down the columns from top to bottom is a representation of the inverted index for a word. For example, the word "rivers" is contained in objects 1, 7, 13, 15, 19, 20, 25, 30 and 31. In one embodiment, an iterator proceeds sequentially in numerical order from lowest to highest. Thus, for example, a first next call to a term iterator for rivers would (for this corpus) return identifier 1 (e.g., the current indicator value for the rivers term iterator would be 1), a second next call to the term iterator for rivers would return 7 (e.g., the current indicator value for the rivers term iterator would be 7), a third next call would return 13 (e.g., the current indicator value for the rivers term iterator would be 13), etc. In other embodiments, almost any reproducible order may be utilized, including an order based on linked lists, non-sequential but monotonic ordering, or other representations or orderings.

For illustrating embodiments as disclosed, this simplified representation will be sufficient.

However it will be understood that an inverted index may be more complex, including information such as the number of times a word is contained in an object, and the position of each instance within the object, or other data. There may also be many other columns for other words (e.g., which are not pertinent to this example search), etc. Other types and more complex indices are fully contemplated herein and embodiments as disclosed may be equally effectively utilized with such indices.

Assume now that a user performs a search of the corpus of objects represented by the inverted index of FIG. 10. In particular, this search may utilize an embodiment of a subset operator to search for 3 (e.g., N or the threshold value) or more of the 5 terms: rivers, lakes, rainfall, ponds, stream, (e.g.: a search for "subset (3, rivers, lakes, rainfall, ponds, stream)").

Looking at FIG. 11, the steps in the execution of one embodiment of a method fora subset iterator are illustrated for the example data of FIG. 10. The column on the left (Operation) identifies the action taken. The other columns are associated with term iterators for each of the terms of the search. Here, there are five term iterators, one for each term of interest: rivers, lakes, rainfall, ponds, stream. Each of the term iterators is responsible for traversing the inverted index (e.g., the example inverted index of FIG. 10) for a corresponding term, advancing to the next object in the list containing the corresponding term when the next interface of the iterator is accessed (e.g., returning the identifier for that object). Thus, the values of each of the rows for each term iterator depict the current object indicator value (e.g., identifier for an object) for the term iterator of the column at the point when the action of the row in the Operation column is taken. The rightmost column indicates when a matching value is found—which occurs when three or more term iterators share the same current indicator value (e.g., identifier for an object).

From an inspection of FIG. 10 above, it can be seen that there are four objects with identifiers 5, 13, 23 and 30 that match the initial search query. For embodiments of a subset iterator, the principle is to advance the sub-node term iterator(s) with the lowest current object indicator value, in this case checking for three or more term iterators with identical current object indicator values. Initially, the sub-node term iterators are initialized by setting their current object indicator values to 0 and the subset iterator has its current indicator set to 0 (STEPS 910, 920). Additionally, the threshold value for the subset iterator is set to 3. The term iterators can then be advanced until there are no more objects (LOOP 930). In the table of FIG. 11, the values which are changed on each row are highlighted.

Specifically, as each term iterator may have a current object indicator value of 0 and the current indicator of the subset iterator is also zero all the term iterators (rivers, lakes, rainfall, ponds, stream) may be advanced (next 0 row) (LOOP 940). The term iterators traverse the inverted index and return current object indicator values (e.g., identifiers) of, respectively, 1 (rivers), 5 (lakes), 1 (rainfall), 3 (ponds) and 2 (stream). In this example, the current indicator for the subset iterator will be set to the minimum of the current object indicator values for the term iterators (here, 1) (STEP 950). In this case there are two iterators with a current object indicator value of 1, which is fewer than the threshold of 3 needed to match (STEP 960).

The iteration continues by advancing the appropriate iterators (LOOP 940). In this example, the current indicator for the subset iterator has been set to 1 so the two term iterators with a current object indicator value of 1 (rivers and rainfall) are advanced (e.g., by calling the next interface of these term iterators) to the respective next object that contains that term (next 1). In this case, the current object indicator value (e.g., object identifier) of the rivers term iterator is 7 and 2 for the rainfall term iterator. Here, the current indicator for the subset iterator will be set to the minimum of the current object indicator values for the term iterators (here, 2) (STEP 950). In this case, there are two term iterators ("rainfall" and "stream") with a current object indicator value of 2, which is fewer that the threshold of 3 needed to match (STEP 960).

The iteration continues by advancing the appropriate iterators (LOOP 940). In this example, the current indicator for the subset iterator has been set to 2 so the two term iterators with a current object indicator value of 2 (rainfall and stream) are advanced (e.g., by calling the next interface of these term iterators) to the respective next object that contains that term (next 2)). In this case, the current object indicator value (e.g., object identifier) of the rainfall term iterator is 5 and 8 for the stream term iterator. Here, the current indicator for the subset iterator will be set to the minimum of the current object indicator values for the term iterators (here, 3) (STEP 950). In this case, there is only one term iterator (ponds) with a current object indicator value of 3, which is fewer that the threshold of 3 needed to match (STEP 960).

Again, iteration continues by advancing the appropriate iterators (LOOP 940). In this example, the current indicator for the subset iterator has been set to 3, so the term iterator with a current object indicator value of 3 (ponds) is advanced (e.g., by calling the next interface of this term iterator) to the respective next object that contains that term (next 3). In this case, the current object indicator value (e.g., object identifier) of the pond term iterator is 5. Here, the current indicator for the subset iterator will be set to the minimum of the current object indicator values for the term iterators (here, 5) (STEP 950). In this case, there are 3 iterators (lakes, rainfall and ponds) with a current object indicator value of 5, which is equal to the threshold of 3 needed to identify a match (STEP 960). Accordingly, the object associated with identifier 5 is identified (e.g., recorded or returned) as a matching object for the search (STEP 970). These steps may repeat as depicted in FIG. 11 until the end of the objects indexed in the inverted index is reached.

It will be noted that while in certain embodiments a subset iterator and methods for implementing the same have been depicted, other embodiments may be possible, including those embodiments that optimize certain aspects of these embodiments. For example, these optimizations may occur with respect to how the term iterators are advanced. In particular, in one embodiment, once a threshold number of term iterators have current indicator values that are the same a match will be recorded for the object associated with that current indicator value.

For example, imagine the 5 term iterators as discussed above had the values: 7, 7, 3, 7, 9 respectively. In one embodiment, the object associated with the identifier 7 would not be identified as a match at this point because only the lowest current indicator value (here 3) is examined for a threshold number of term iterators. However, in another embodiment, the step of advancing the term iterator associated with current indicator value of 3 until a current indicator value of 7 is the lowest value across the term iterators, since it may be impossible to get the threshold of 3 or more term iterators having the same current indicator value for any current indicator value of less than 7. Similarly, embodiments could terminate once enough term iterators reached a point where a threshold number of term iterators having the same current indicator value is impossible. Other optimizations may be possible.

Other variations may also be possible as well. For example, in one embodiment, a subset iterator may identify an object as matching if a threshold number of term iterators have the same current object indicator value (e.g., object identifier). In another embodiment, it can be determined how many of the term iterators (e.g., more than the threshold value) will return the same current object indicator value. This data may be used to perform or affect a relevance computation associated with the object or objects of the corpus. To illustrate, the example above skips ahead immediately upon finding 3 or more term iterators with the same current object indicator value. Another embodiment may proceed to determine if 4 or 5 values could be matched, and return this information to affect relevance computation. In practice, matching all 5 values might be considered more relevant than matching only 3 values.

The illustrated embodiment also uses simple iterators that work on inverted indexes and words. In other embodiments, an iterator could be comprised of one or more sub-trees of other iterators, allowing an arbitrarily complex search query to be performed as a component of the subset operation. Iterators might also work on non-word data types, such as numeric or date range matching. A specific example of this concept to illustrate might be the application of stemming. Imagine that stemming expansion of the word "lakes" matched the words "lake", "lakes", "laked". Instead of an iterator for "lakes", an iterator tree that performed (lake OR lakes OR laked) would be used in its place. This use of sub-trees may be important. Assume a document contained only the words: lake, lakes, rivers. In a subset processing with stemming of the word lake, the presence of both words lake and lakes may not count as two matches, but instead only count as 1 match.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Those skilled in the relevant art will appreciate that the invention can be implemented or practiced with other computer system configurations including, without limitation, multi-processor systems, network devices, mini-computers, mainframe computers, data processors, and the like. The invention can be embodied in a general purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a set of distributed computers communicatively coupled to a network (for example, the Internet). Any suitable programming language can be used to implement the routines, methods or programs of embodiments of the invention described herein, including C, C++, Java, JavaScript, HTML, or any other programming or scripting code, etc. Other software/hardware/network architectures may be used. Communications between computers implementing embodiments can be accomplished using any electronic, optical, radio frequency signals, or other suitable methods and tools of communication in compliance with known network protocols.

Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only to those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Generally then, although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

What is claimed is:

1. A non-transitory computer readable medium, comprising instructions for:
    accessing a corpus and an index of the corpus in a data store, the corpus comprising a set of objects, each object associated with a corresponding identifier;
    receiving a first search query having a search operator, the search operator including a block of text, the block of text comprising a set of text terms;
    determining an initial set of search terms from the set of text terms;
    ordering the initial set of search terms using a set of preselection rules;
    selecting a final set of search terms from the initial set of search terms based on the order of the initial set of search terms, where the final set of search terms is a reduced number of the initial set of search terms;
    constructing a second search query from the final set of search terms;
    executing the second search query against the corpus of objects using the index of the corpus to determine a set of responsive objects to the second search query; and
    returning the identifiers for the one or more responsive objects of the corpus in response to the first search query.

2. The non-transitory computer readable medium of claim 1, wherein the second search query comprises a subset operator including a threshold and the final set of search terms.

3. The non-transitory computer readable medium of claim 2, further comprising instructions for:
    generating a search tree for the subset operator, the search tree having a subset operator node including a subset process configured according to the threshold.

4. The non-transitory computer readable medium of claim 3, wherein the subset operator node has, for each of the final set of search terms, a sub-node comprising a term process corresponding to that search term.

5. The non-transitory computer readable medium of claim 4, wherein each of the term processes is an iterator configured to evaluate the objects of the corpus according to an order of the identifiers of the objects.

6. The non-transitory computer readable medium of claim 1, wherein each of the initial set of search terms comprises a text term.

7. The non-transitory computer readable medium of claim 1, wherein the ordering of the initial set of search terms is based on one or more stop words.

8. A method, comprising:
    accessing a corpus and an index of the corpus in a data store, the corpus comprising a set of objects, each object associated with a corresponding identifier;
    receiving a first search query having a search operator, the search operator including a block of text, the block of text comprising a set of text terms;
    determining an initial set of search terms from the set of text terms;
    ordering the initial set of search terms using a set of preselection rules;
    selecting a final set of search terms from the initial set of search terms based on the order of the initial set of search terms, where the final set of search terms is a reduced number of the initial set of search terms;
    constructing a second search query from the final set of search terms;
    executing the second search query against the corpus of objects using the index of the corpus to determine a set of responsive objects to the second search query; and
    returning the identifiers for the one or more responsive objects of the corpus in response to the first search query.

9. The method of claim 8, wherein the second search query comprises a subset operator including a threshold and the final set of search terms.

10. The method of claim 9, further comprising:
    generating a search tree for the subset operator, the search tree having a subset operator node including a subset process configured according to the threshold.

11. The method of claim 10, wherein the subset operator node has, for each of the final set of search terms, a sub-node comprising a term process corresponding to that search term.

12. The method of claim 11, wherein each of the term processes is an iterator configured to evaluate the objects of the corpus according to an order of the identifiers of the objects.

13. The method of claim 8, wherein each of the initial set of search terms comprises a text term.

14. The method of claim 8, wherein the ordering of the initial set of search terms is based on one or more stop words.

15. A system, comprising:
a processor; and
a non-transitory computer readable medium, comprising instructions for:
accessing a corpus and an index of the corpus in a data store, the corpus comprising a set of objects, each object associated with a corresponding identifier;
receiving a first search query having a search operator, the search operator including a block of text, the block of text comprising a set of text terms;
determining an initial set of search terms from the set of text terms;
ordering the initial set of search terms using a set of preselection rules;
selecting a final set of search terms from the initial set of search terms based on the order of the initial set of search terms, where the final set of search terms is a reduced number of the initial set of search terms;
constructing a second search query from the final set of search terms;
executing the second search query against the corpus of objects using the index of the corpus to determine a set of responsive objects to the second search query; and
returning the identifiers for the one or more responsive objects of the corpus in response to the first search query.

16. The system of claim 15, wherein the second search query comprises a subset operator including a threshold and the final set of search terms.

17. The system of claim 16, further comprising:
generating a search tree for the subset operator, the search tree having a subset operator node including a subset process configured according to the threshold.

18. The system of claim 17, wherein the subset operator node has, for each of the final set of search terms, a sub-node comprising a term process corresponding to that search term.

19. The system of claim 18, wherein each of the term processes is an iterator configured to evaluate the objects of the corpus according to an order of the identifiers of the object.

20. The system of claim 15, wherein each of the initial set of search terms comprises a text term.

21. The system of claim 15, wherein the ordering of the initial set of search terms is based on one or more stop words.

* * * * *